US010801789B2

(12) United States Patent
Subramanyam et al.

(10) Patent No.: US 10,801,789 B2
(45) Date of Patent: Oct. 13, 2020

(54) HEAT EXCHANGERS WITH IMPROVED FLUID DISTRIBUTION

(71) Applicant: Senior UK Limited, Crumlin, Gwent (GB)

(72) Inventors: Ragu Subramanyam, Blackwood (GB); Adrián Loureiro Fernández, Cardiff (GB)

(73) Assignee: Senior UK Limited, Crumlin, Gwent (GB)

( * ) Notice: Subject to any disclaimer, the term of this patent is extended or adjusted under 35 U.S.C. 154(b) by 66 days.

(21) Appl. No.: 16/268,362

(22) Filed: Feb. 5, 2019

(65) Prior Publication Data
US 2020/0248973 A1  Aug. 6, 2020

(51) Int. Cl.
*F28F 7/00* (2006.01)
*F28F 3/12* (2006.01)
(Continued)

(52) U.S. Cl.
CPC .............. *F28F 3/12* (2013.01); *F28F 9/0221* (2013.01); *H01M 10/613* (2015.04);
(Continued)

(58) Field of Classification Search
CPC ........ F28F 3/12; F28F 9/0221; H01M 10/613; H01M 10/625; H01M 10/6554; H01M 10/6556; H01M 2220/20
(Continued)

(56) References Cited

U.S. PATENT DOCUMENTS 8,951,655 B2   2/2015   Chung et al.
8,968,904 B2   3/2015   Han et al.
(Continued)

FOREIGN PATENT DOCUMENTS

DE        102012006122 A1     9/2013

OTHER PUBLICATIONS

Wang, et al., "Characteristics of flow distribution in compact parallel flow heat exchangers, part I: Typical inlet header," Applied Thermal Engineering 31 (2011) 3226-3234.
(Continued)

*Primary Examiner* — David D Hwu
(74) *Attorney, Agent, or Firm* — Greenberg Traurig, LLP

(57) ABSTRACT

A heat exchanger for regulating the temperature of objects using coolant includes a top plate, a middle plate, and a bottom plate that are sealedly engaged for circulation of coolant, and collectively form a stacked cooling block. The heat exchanger includes a plurality of coolant flow channels, including sets of feed and return channels, which are formed between the top, middle, and bottom plates, and which operably cool one or more cooling surfaces of the heat exchanger. An inlet manifold of the heat exchanger distributes coolant through a plurality of distribution apertures, into a set of coolant feed channels. The coolant feed channels are fluidly connected with a set of coolant return channels, which in turn direct coolant toward and into an outlet manifold. The inlet manifold is adapted to substantially evenly distribute fluid through the plurality of coolant flow channels, by way of one or more flow-balancing elements integrated therewith.

15 Claims, 18 Drawing Sheets
(1 of 18 Drawing Sheet(s) Filed in Color)

(51) Int. Cl.
*F28F 9/02* (2006.01)
*H01M 10/613* (2014.01)
*H01M 10/6556* (2014.01)
*H01M 10/6554* (2014.01)
*H01M 10/625* (2014.01)

(52) U.S. Cl.
CPC ..... *H01M 10/625* (2015.04); *H01M 10/6554* (2015.04); *H01M 10/6556* (2015.04); *H01M 2220/20* (2013.01)

(58) Field of Classification Search
USPC ........................................................ 165/80.4
See application file for complete search history.

(56) References Cited

U.S. PATENT DOCUMENTS

| | | | |
|---|---|---|---|
| 8,999,548 B2 | 4/2015 | Sun et al. | |
| 9,028,989 B2 | 5/2015 | Zhang et al. | |
| 9,379,420 B2 | 6/2016 | Ketkar et al. | |
| 9,441,681 B2 | 9/2016 | Williams | |
| 9,614,206 B2 | 4/2017 | Choi et al. | |
| 10,006,722 B2 | 6/2018 | Kenney et al. | |
| 2012/0170222 A1* | 7/2012 | Dede | F28F 3/083 |
| | | | 361/702 |
| 2013/0283835 A1* | 10/2013 | Katoh | B60H 1/00342 |
| | | | 62/180 |
| 2016/0204486 A1 | 7/2016 | Kenney et al. | |
| 2016/0315365 A1 | 10/2016 | Vanderwees et al. | |
| 2017/0051987 A1 | 2/2017 | Vanerwees et al. | |
| 2017/0241716 A1* | 8/2017 | Schatz-Knecht | B23K 35/302 |

OTHER PUBLICATIONS

Wang, et al., "Characteristics of flow distribution in compact parallel flow heat exchangers, part II: Modified inlet header," Applied Thermal Engineering 31 (2011) 3235-3242.

* cited by examiner

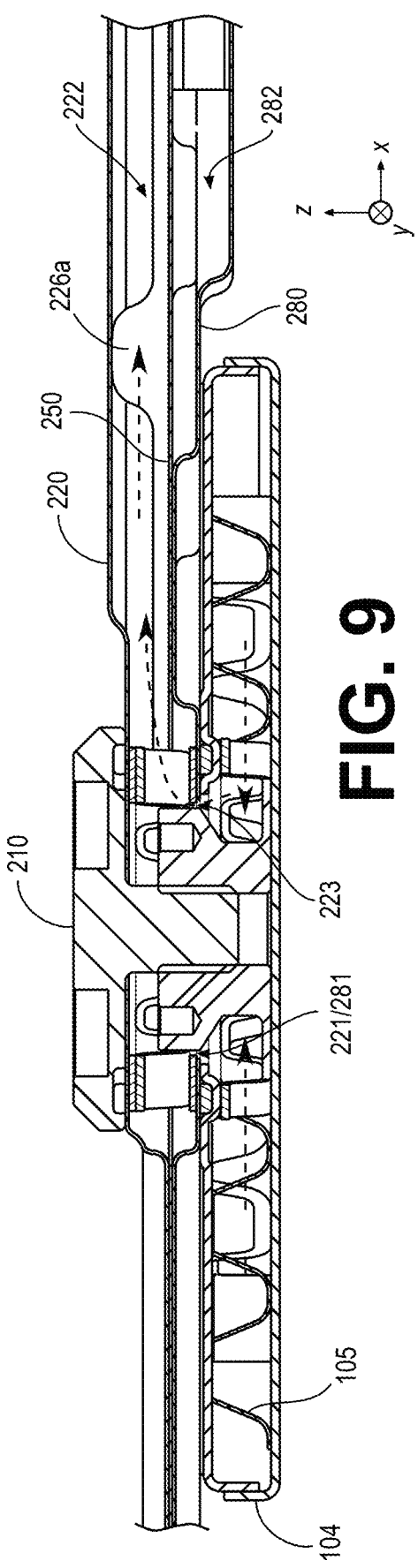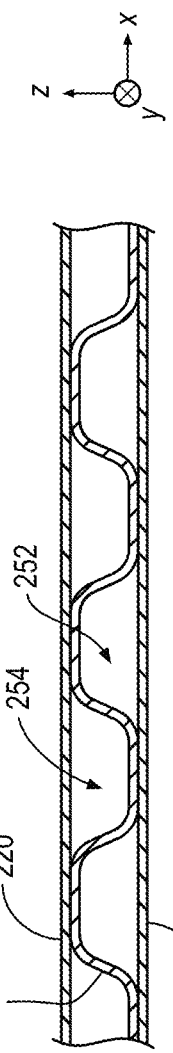

HEAT EXCHANGERS WITH IMPROVED FLUID DISTRIBUTION

FIELD OF THE INVENTION

The present invention generally relates to heat exchangers, and more specifically to low-profile heat exchangers with improved coolant distribution for dissipating heat from and transmitting heat to heat emitting objects requiring temperature control, such as batteries, including battery systems for electric vehicles.

BACKGROUND OF THE INVENTION

The performance of various kinds of devices—such as transistors, circuit components, integrated circuits, and batteries—often directly correlates with temperature. In general, an increase in temperature causes an increase in impedance in conductors and semiconductors which, in turn, can lead to an even greater production of heat. This heat-impedance feedback loop is well known. To reduce or maintain a level of heat, devices that produce heat are commonly cooled by heat sinks, fans, or liquid cooling apparatuses. Some systems include temperature probes that monitor for overheating and, if detected, intentionally throttle down performance or shut down the device entirely to prevent permanent damage.

Likewise, the performance and product lifetime of some batteries can be affected by the temperatures generated by those batteries—both in the short-term and long-term. Many batteries discharge stored energy through electrochemical reactions, the rate of which depends, in part, upon the temperature of the electrodes and electrolyte of the battery, according to the well-known Arrhenius equation. Additionally, excessive heat can cause a degradation in the electrolytes of many types of rechargeable batteries, thereby reducing a battery's life span and maximum charge capacity. Like semiconductor devices, batteries can also experience heat runaway if the temperature of the battery exceeds a catalyst temperature, which can lead to fire or explosion. Conversely, at lower temperatures batteries function sub-optimally, such that increasing their temperature would result in improved performance.

Thermal gradients across a battery cell can also have a negative impact on a battery's performance and longevity. For instance, an intra-cell temperature gradient can affect the diffusion and charge transfer reaction process in rechargeable batteries, such as in lithium ion batteries. Additionally, differences in temperature across a single battery cell can result in an increase in battery impedance, which in turn may lead to the production of more heat as energy is dissipated through that impedance.

In some applications, multiple batteries or battery cells are electrically connected to each other in series or parallel. Temperature differences between batteries or battery cells within a pack can also reduce the performance of the entire pack—even if the temperatures in each battery or cell is within a nominal operating temperature range. In systems that rely heavily on battery pack performance (e.g., electric vehicles), it is desirable to have a battery pack that can withstand rapid charging and discharging. However, temperature differences across batteries or battery cells in a pack, even by a few degrees Celsius, might render the performance of the entire pack inadequate for some applications.

The known effects of high temperatures, temperature gradients, and temperature differences within electronic devices, and across battery cells, has led to the development of cooling and heat management systems for such devices and batteries. Passive cooling mechanisms, such as heat sinks, are typically insufficient for high performance applications. Active cooling mechanisms that utilize forced air cooling (e.g., fans) or circulated liquid cooling are more common in systems that generate substantial amounts of heat, or are otherwise crippled by overheating. Often, passive components such as heat sinks and thermal paste are coupled with active cooling elements in thermal management systems, in order to achieve a greater amount of cooling.

A traditional liquid-cooling thermal management system includes a thermally-conductive element in direct or proximate contact with the object to be cooled (e.g., a metal plate or heat sink), which draws heat from the object. That thermally-conductive element is in thermal contact with a coolant, either directly (e.g., as the outer surface of a liquid coolant conduit) or indirectly (e.g., in contact with a separate liquid coolant conduit), thereby drawing heat from the thermally-conductive element. The warmed/cooled liquid coolant then flows to a heat exchanger or a heater, such as a radiator or electrical heater, which regulates the temperature of the liquid coolant before recirculating the liquid coolant back toward the thermally-conductive element.

Traditional liquid temperature control systems, which are often more effective at transferring heat from/to an object compared to air-cooled systems, may not adequately address the above-described issues arising from temperature gradients within battery cells and temperature differentials across battery cells. For instance, the level of cooling in traditional liquid cooling systems is often not uniform across a given surface area. As liquid coolant flows from an inlet toward an outlet, it accumulates heat, thereby rendering the liquid near the coolant outlet warmer than liquid near the inlet. This temperature gradient in the liquid coolant itself can result in a corresponding temperature gradient across the object being cooled. The liquid coolant temperature gradient can also lead to a temperature differential between two objects being cooled by the same system. Such uneven cooling can substantially reduce the performance of a battery pack, reduce the longevity of the battery pack, and in some cases may be dangerous as localized impedances and degradations build up in the battery cells over time.

One known technique for reducing the severity of temperature gradients across a surface of a circulated coolant-type heat exchanger involves providing a set of channels in a counter-flow or "countercurrent" arrangement. In a counter-flow heat exchanger, a set of "cold" fluid channels, with fluid flowing in one direction, are interlaced with and in thermal connection with a set of "warm" fluid channels with fluid flowing in the opposite direction. The "cold" fluid channels may receive liquid coolant supplied from an inlet, whereas the "warm" fluid channels may receive liquid coolant supplied (or recirculated) from the "cold" channels. In such an arrangement, alternating the "hot" and "cold" channels serves to reduce temperature gradients along the coolant flow direction.

While counter-flow channel designs can mitigate temperature gradients, the temperature gradients across a typical counter-flow heat exchanger may still be too large for some applications. It is therefore an object of the present invention to provide heat exchangers capable of providing both effective and substantially uniform cooling across its heat-exchanging surface area.

In addition, it is often desirable to provide a low-profile battery pack that can fit into smaller spaces. In electric vehicles, for example, battery packs are commonly located beneath the passenger cabin—rather than in the trunk or under the hood—in order to improve the safety and handling of the vehicle. One goal of battery pack design may be, therefore, to minimize the size of the thermal management system along one or more dimensions to thereby provide the maximum amount of space for the batteries—all within a relatively small assembly. It is therefore another object of the present invention to provide heat exchangers that are capable of providing substantially uniform cooling, while simultaneously being shallow, thin, low-profile, or otherwise limited in size along at least one dimension.

These and other objectives and advantages of the present invention will become apparent from the following detailed written description, drawing figures, and claims.

SUMMARY OF THE INVENTION

To accomplish the aforementioned objectives, embodiments of the present invention provide for heat exchangers that significantly improve upon existing counter-flow heat exchangers by incorporating one or more fluid distribution features that increase the temperature uniformity across the cooling regions of the heat exchangers. In one example, a heat exchanger includes a cooling "block" formed from a stack of three plates—a top plate, a middle plate, and a bottom plate. The top plate and/or the bottom plate includes one or more cooling surfaces, such as flat regions against which objects are in thermal connection (either directly, or indirectly via passive elements such as attached metal fins or heat sinks).

The middle plate includes a series of elongated corrugations that, when situated between the top and bottom plates, forms two sets of sealed, coolant-flow channels: namely "feed" channels formed in the space between the corrugations and the top plate, and "return" channels formed in the space between the corrugations and the bottom plate, both of which extend substantially across the width of the cooling block. The top plate has formed therein an inlet distribution manifold, in fluid connection with a coolant inlet, which directs liquid coolant through a plurality of distribution apertures and into the feed channels. Similarly, the bottom plate has formed therein an outlet collection manifold, which directs fluid from the return channels, through a set of outlet collection apertures, for direction toward a coolant outlet.

In some embodiments of the present invention, the feed and return channels are "interlaced," such that each feed channel (other than the channels at the respective ends of the heat exchanger) is directly adjacent to a pair of return channels, and vice versa. At the side of the block, opposite the inlet and outlet manifolds, one or more recirculation apertures is provided in the middle plate, which allows liquid coolant in the feed channels to flow into the return channels. During a cooling operation, the feed channels have flowing therethrough lower temperature liquid coolant compared to the return channels, as the coolant flowing through the return channels has already drawn heat from the electrical components or batteries as it flowed through the feed channels. Interlacing the feed and return channels, therefore, results in more efficient temperature uniformity—at least along the axes parallel to the coolant flow channels.

However, temperature uniformity in yet other dimensions is also desirable.

While the above-described counter-flow channel arrangement may reduce temperature variation along the coolant channels, such an arrangement may still have substantial temperature gradients across the coolant channels. Depending on the arrangement of the object or objects to be cooled, a temperature gradient across coolant channels may degrade performance, reduce longevity, and/or lead to dangerous operating conditions.

One of the contributing factors leading to uneven cooling across cooling channels is the net volume of coolant flowing through each channel for a given period of time. For instance, if one coolant channel has twice as much coolant flowing through it per minute compared to another coolant channel, the coolant channel with a higher volume of coolant flow will effect a greater amount of cooling in the region proximate that channel, compared to the other coolant channel. The amount of fluid flow through a given region, channel, or portion of a heat exchanger may be proportionate with one or more of the fluid pressure and/or fluid velocity. Accordingly, differences in fluid pressure and/or fluid velocity across coolant channels may also lead to temperature gradients across those channels.

To allay this problem, heat exchangers according to the present application may incorporate one or more fluid velocity, pressure, and/or volume balancing features which, during operation, lead to more uniform temperatures across the coolant channels.

For instance, an example heat exchanger may include a plurality of inlet distribution apertures, which fluidly connects an inlet distribution manifold with a set of feed channels. As coolant flows from a coolant inlet and along the inlet distribution manifold, a portion of that coolant is directed through inlet distribution apertures proximate to the coolant inlet, thereby leading to a decrease in fluid velocity. Because fluid velocity decreases from the coolant inlet toward the opposite end of the inlet distribution manifold, the distances between adjacent inlet distribution apertures may be larger near the coolant inlet compared to the distances between adjacent inlet distribution apertures far from the coolant inlet. By providing a higher "density" of inlet distribution apertures in portions of the inlet distribution manifold, where fluid velocity/pressure differential could be relatively low, the distribution of coolant may be more evenly balanced—at least with respect to a heat exchanger in which the spacing between inlet distribution apertures is the same along an entire manifold.

As another example, a heat exchanger according to the present application may include two or more inlet distribution aperture sizes (e.g., cross sectional area, or "CSA"). Varying inlet distribution aperture sizes across the inlet distribution manifold may balance the particular fluid dynamics of a specific heat exchanger design. For instance, similar to the example provided above, the size of inlet distribution apertures near a coolant inlet may be smaller than the size of inlet distribution apertures far from the coolant inlet, so as to compensate for the decreased fluid velocity toward the end opposite the coolant inlet.

Alternatively, and/or additionally, fluid velocities near the inlet may be substantial, such that coolant may flow past the first few inlet distribution apertures proximate the coolant inlet. Inlet distribution aperture sizes may be smaller near the middle or end of the inlet distribution manifold opposite the coolant inlet, in order to create a backpressure that encourages coolant to flow through the first few inlet distribution apertures. Thus, depending on the particular implementation, inlet distribution aperture sizes may increase and/or decrease along the inlet distribution manifold, so as to provide backpressures that allow for greater, more efficient fluid flow at lower velocities, and/or to balance out the fluid dynamics arising from other aspects of the heat exchanger's design.

Some heat exchangers according to the present application may include multiple "matrixes"—or sections of the heat exchanger corresponding to distinct cooling surfaces adjacent to a subset of the cooling channels. In these embodiments, the fluid connections between adjacent matrixes may be restricted, to further balance coolant flow rates into the coolant channels associated with each respective matrix. For applications that demand substantial cooling, such as the cooling of batteries powering electric vehicles, coolant may flow into the inlet distribution manifold from a coolant inlet at a high velocity. In these circumstances, an example heat exchanger with multiple matrixes may include "transition" channels within the inlet distribution manifold, which may also create backpressure during operation, to encourage coolant to flow more evenly into each of the matrixes.

In some heat exchanger arrangements, one or more inlet distribution apertures may receive comparatively less coolant, due to the fluid dynamics within the inlet distribution manifold. For instance, the first inlet distribution aperture of a given matrix (e.g., adjacent to a transition channel) may receive an insufficient amount of coolant during operation. To further balance the coolant distribution—and, in turn, reduce temperature gradients across the heat exchanger—one or more inlet distribution apertures may be oriented, curved, angled, or otherwise shaped in a way that increases or decreases the coolant flow rate through those one or more apertures. For example, an inlet distribution aperture proximate to a transition channel may be angled, tapered, or curved to compensate for low fluid pressure and/or velocity near that aperture.

Other aspects of a heat exchanger's structure and arrangement may be varied to further balance fluid pressures, velocities, and flow rates during operation. For example, obstructions may be intentionally integrated with or situated within the inlet distribution manifold to increase the turbulence within the manifold, among other things. The shape of the inlet distribution manifold may also be adjusted to mitigate against portions in which fluid velocities are abnormally low or high. As a specific example, the end of the inlet distribution manifold opposite the coolant inlet may be tapered or curved, to encourage coolant that collides with that end of the manifold to flow toward one or more of the nearby inlet distribution apertures. Other flow-balancing features are also possible.

While various example flow balancing features are described above and in greater detail below, it should be understood that the particular dimensions, shapes, and features used in a specific implementation may depend on the fluid dynamics of that specific implementation. The specific examples shown and described herein are provided for explanatory purposes. Different combinations of flow balancing elements may be present in various implementations. The present application is not limited to the explicitly provided examples.

According to a first aspect of the present invention, there is provided a heat exchanger for cooling objects, using recirculated coolant. The heat exchanger includes a top plate, a bottom plate, and a middle plate operably situated between the top and bottom plates. The top, middle, and bottom plates are sealedly engaged for circulation of the coolant, and collectively form a "stacked" cooling block having an inlet end and an outlet end substantially opposite the inlet end, and a manifold side and a recirculation side substantially opposite the manifold side. The manifold side and recirculation side are operably positioned between the inlet and outlet ends, respectively. The heat exchanger also includes a plurality of coolant flow channels extending substantially between the manifold and recirculation sides. The plurality of coolant flow channels include a set of coolant feed channels, which are formed between the top and middle plates, and a set of coolant return channels, which are formed between the bottom and middle plates. The coolant feed channels and coolant return channels are fluidly connected through one or more recirculation apertures formed in the middle plate proximate to the recirculation side. In addition, the heat exchanger includes an inlet distribution manifold formed between the top and middle plates proximate to the manifold side, and extending substantially between the inlet and outlet ends. The inlet distribution manifold is adapted to receive coolant from a coolant inlet port positioned proximate to the inlet end to, in turn, direct coolant through a plurality of inlet distribution apertures fluidly connected to the set of coolant feed channels. The heat exchanger further includes an outlet collection manifold formed between the bottom and middle plates proximate to the manifold side and extending substantially between the inlet and outlet ends. The inlet distribution manifold is adapted to receive coolant from the set of coolant return channels through a plurality of outlet collection apertures fluidly connected thereto, and is positioned to direct coolant toward a coolant outlet port positioned proximate to the outlet end. The outlet collection manifold is also in substantial stacked alignment with the inlet distribution manifold (e.g., along the z-axis, as defined in FIGS. 1-14 of the present application).

In some embodiments according to the first aspect, the plurality of inlet distribution apertures includes (i) one or more first inlet distribution apertures having a first cross sectional area, and (ii) one or more second inlet distribution apertures having a second cross sectional area that is larger than the first cross sectional area. The one or more first inlet distribution apertures are positioned nearer to the coolant inlet port than the positions of the one or more second inlet distribution apertures, to promote substantially even coolant distribution through at least the one or more first inlet distribution apertures positioned closer to the coolant inlet port. The one or more second inlet distribution apertures are positioned further from the coolant inlet port, relative to the positions of the one or more first inlet distribution apertures.

In some embodiments according to the first aspect, the plurality of inlet distribution apertures includes at least (i) a first pair of inlet distribution apertures having a first distance extending therebetween, and (ii) a second pair of inlet distribution apertures having a second distance extending therebetween that is smaller than the first distance. The first pair of inlet distribution apertures is positioned nearer to the coolant inlet port than the second pair of inlet distribution apertures, to promote substantially even coolant distribution through at least the first and second pairs of inlet distribution apertures.

In some embodiments according to the first aspect, the cooling block includes a first matrix and a second matrix. The first matrix includes a first series of the plurality of coolant flow channels, a first section of the inlet distribution manifold, and a first series of the inlet distribution channels. The second matrix includes a second series of the plurality of coolant flow channels, a second section of the inlet distribution manifold, and a second series of the inlet distribution channels. The first matrix may be positioned closer to the coolant inlet port than the second matrix. The first and second sections of the inlet distribution manifold are fluidly connected, to distribute coolant into both the first and second series of the plurality of coolant flow channels.

In some embodiments, the first series of inlet distribution apertures of the first matrix may include (i) a first pair of inlet distribution apertures having a first distance extending therebetween, and (ii) a second pair of inlet distribution apertures having a second distance extending therebetween that is smaller than the first distance. The first pair of inlet distribution apertures are positioned closer to the coolant inlet port than the second pair of inlet distribution apertures, to promote substantially even coolant distribution through at least the first and second pairs of inlet distribution apertures.

In some implementations, the first series of inlet distribution apertures of the first matrix each have a first cross sectional area, and the second series of inlet distribution apertures of said second matrix each have a second cross sectional area that is larger than the first cross sectional area, to promote substantially even coolant distribution between the first and second portions of the inlet distribution manifold.

In yet other embodiments according to the first aspect, the inlet distribution manifold also includes one or more transition channels extending substantially between the first section of the inlet distribution manifold and the second section of the inlet distribution manifold. The one or more transition channels restrict coolant fluid flow between the first and second sections of the inlet distribution manifold, such that coolant entering the inlet distribution manifold through the coolant inlet port is substantially evenly distributed between the first and second sections of the inlet distribution manifold.

In this embodiment, the second series of inlet distribution apertures of the second matrix may include at least one distribution aperture that is proximate to the one or more transition channels and is angled relative to the other inlet distribution channels of the second series of inlet distribution channels, to promote substantially even coolant distribution across each aperture of the second series of inlet distribution apertures.

In addition to the embodiments that include the first and second matrixes described above, some embodiments may also include third matrix that comprises a third series of the plurality of coolant flow channels, a third section of the inlet distribution manifold, and a third series of the inlet distribution channels. The third matrix is positioned further from the coolant inlet port than the second matrix. The second and third sections of the inlet distribution manifold are also fluidly connected, such that said inlet distribution manifold distributes coolant into the first, second, and third series of the plurality of coolant flow channels.

Some embodiments that utilize transition channels may include one or more first transition channels extending substantially between the first and second sections of the inlet distribution manifold, and one or more second transition channels extending substantially between the second and third sections of the inlet distribution manifold. The one or more second transition channels restrict coolant fluid flow between the second and third sections of the inlet distribution manifold, such that coolant entering the inlet distribution manifold through the coolant inlet port is substantially evenly distributed among the first, second, and third sections of the inlet distribution manifold.

In some embodiments according to the first aspect, the heat exchanger also includes a coolant inlet rail in fluid connection with the coolant inlet port and adapted to direct coolant through the coolant inlet port and into the inlet distribution manifold.

Likewise, in some embodiments according to the first aspect, the heat exchanger may also include a coolant outlet rail in fluid connection with said coolant outlet port and adapted to receive coolant through the coolant outlet port from the outlet collection manifold.

In some embodiments according to the first aspect, the heat exchanger also includes a plurality of cooling fins in contact with and extending from the top plate, which are adapted to draw heat away from objects in contact therewith to, in turn, exchange heat with coolant flowing through the plurality of coolant flow channels.

In some embodiments according to the first aspect, the heat exchanger further includes one or more inlet manifold supports situated within said inlet distribution manifold. The heat exchanger may also include, in some embodiments, one or more outlet manifold supports situated within said outlet collection manifold.

The foregoing summary is illustrative only and is not intended to be in any way limiting. In addition to the illustrative aspects, embodiments, and features described above, further aspects, embodiments and features will become apparent by reference to the drawing figures, the following detailed description, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the invention, and to show how the same may be implemented, there will now be described by way of example only, specific embodiments, methods and processes according to the present invention with reference to the accompanying drawings in which:

FIG. 9 is an elevated, cross-sectional side view of the invention illustrating a fluid flow path near the coolant inlet port of the example cooling block, according to the embodiment of FIG. 8, taken along lines 9-9 and looking in the direction of the arrows;

FIG. 9A is an elevated, cross-sectional side view illustrating the cooling channels of the example cooling block, according to the embodiment of FIG. 2, taken along lines 9A-9A of FIG. 2, looking in the direction of the arrows;

DETAILED DESCRIPTION OF THE EMBODIMENTS

There will now be described by way of example, several specific modes of the invention as contemplated by the inventor. In the following description, numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description of the invention.

Embodiments of the present invention provide low-profile, flow-balanced heat exchangers for integration with thermal management systems. As described above, the performance of some systems, such as high performance battery packs for electric vehicles, depends on the extent to which its thermal management system can provide cooling that is both sufficient and substantially uniform. For example, high performance rechargeable battery packs may include a large number of battery cells, some electrically connected in series (e.g., to provide adequate voltage) and others electrically connected in series (e.g., to increase current input and output). Temperature variations within individual cells, as well as across cells, may hinder the battery system's ability to rapidly charge and discharge.

Embodiments of the present invention provide low-profile, flow-balanced heat exchangers for integration with thermal management systems capable of maintaining substantially uniform temperatures across its cooling surfaces. An example thermal management system includes a coolant inlet rail, a coolant outlet rail, and a plurality of cooling "blocks" fluidly coupled therebetween by way of respective inlet and outlet ports. Each cooling block includes one or more flow balancing features to provide substantially even coolant flow rates throughout the entire block—which has the effect of providing substantially even amounts of cooling across the block's cooling surface.

Figure 15:
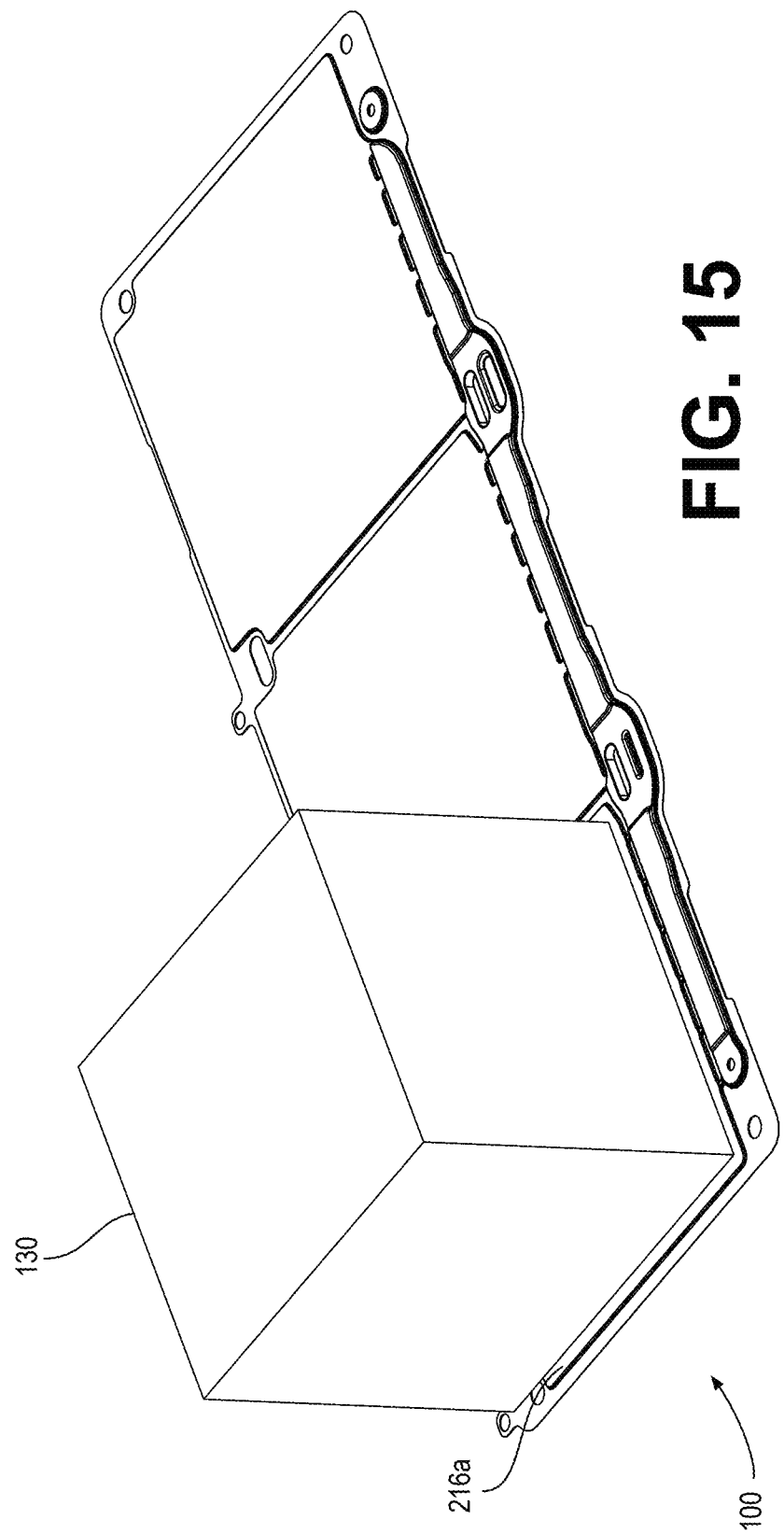
FIG. 15 is a perspective view illustrating an example arrangement of a battery pack on a cooling block of the heat exchanger assembly, according to the embodiment of FIG. 1.

In an example implementation, each cooling block has coupled thereto a set of metal "fins" or heat sinks, which protrude outwardly from its cooling surface or surfaces. As shown in FIG. 15, a battery pack consisting of batteries or battery cells sandwiched between metal fins is positioned against the cooling block, which generates heat or is heated during operation. Heat from the battery cells is transferred to the fins, which in turn transfers the heat to the cooling surface or surfaces of the block. Coolant flowing through the cooling blocks draws the heat from the cooling surface or surfaces, which is directed through a coolant outlet port and into the outlet rail. A separate system (e.g., a radiator) may be used to continuously reduce the temperature of the coolant, which is then continuously supplied back into the thermal management system through a pipe connected to the coolant inlet rail.

Various aspects of a cooling block—including the sizes, shapes, and arrangement of manifolds, apertures, and channels through which coolant flows—may be specifically tuned, in order to generate a substantially even fluid distribution throughout the cooling block's coolant flow paths. In multi-block systems, aspects of the coolant inlet and outlet ports may also be tuned to provide substantially even fluid distribution (or to at least mitigate otherwise uneven fluid distribution) across each cooling block. The following description, with respect to FIGS. 1-16, illustrates an example heat exchanger assembly with structural elements that, in combination, produce substantially even fluid distribution and cooling efficiencies throughout the cooling blocks, during operation.

As described herein, "coolant" may refer to any fluid—including gas, liquid, or some combination thereof—serving as a medium that draws heat from cooling blocks to cool or otherwise thermally modulate an object or objects. Although a "coolant" may be described herein as a liquid, the present application is not limited to liquid coolants. Any recitation of "liquid coolant" should be understood to encompass coolants that may not necessarily be in a liquid state.

As described herein, fluid "distribution" may refer to the extent to which a total amount of fluid circulates through various flow paths of a heat exchanger over a given period of time. Fluid distribution may be described as "uneven" where fluid along one flow path has a greater flux (e.g., volume per unit time), flow rate (e.g., velocity), and/or pressure relative to that of fluid along a different flow path. In contrast, fluid distribution may be described as "even" with respect to two or more flow paths when the fluid flux, flow rate, and/or pressure is the same, substantially the same, or differs by only an acceptable amount.

The following description of FIGS. 1-16 may include orientation terminology such as "top," "bottom," "inlet end," and "outlet end," among other terms. These terms are described with respect to axes provided in each of the drawings, and may be alternated as desired.

Figure 1:
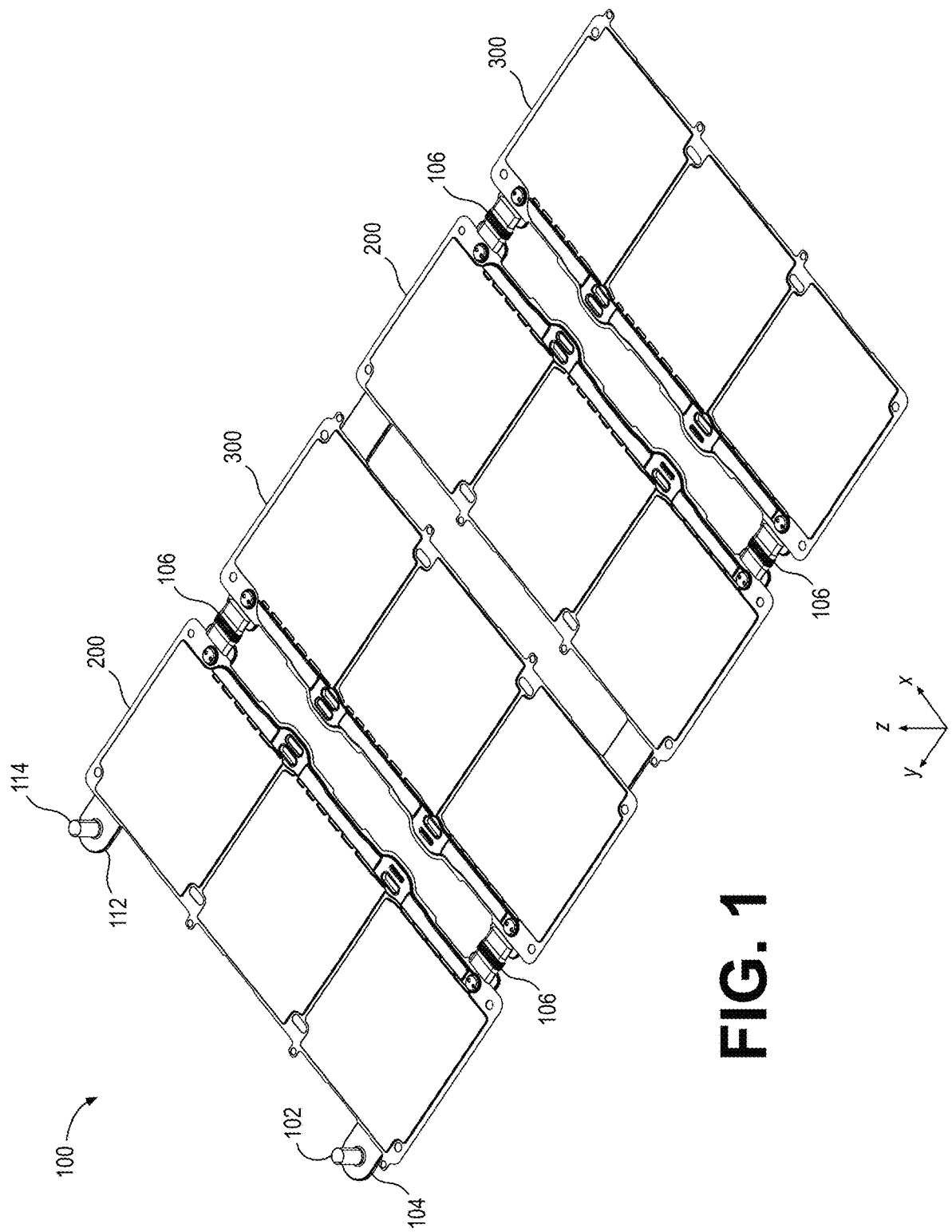
FIG. 1 is a perspective view of an example heat exchanger assembly, of the present invention.

FIG. 1 is a perspective view of an example heat exchanger assembly 100. Heat exchanger assembly 100 includes inlet pipe 102 connected to inlet rail 104, and outlet pipe 112 connected to outlet rail 114. Inlet rail 104 and outlet rail 114 include connecting bellows 106, which provide an expandable fluid connection between separate sections of inlet rail 104 and outlet rail 114. Cooling blocks 200 and cooling blocks 300 extend across, and are fluidly connected between, inlet rail 104 and outlet rail 114. The differences between cooling block 200 and cooling block 300 are described below with respect to FIG. 14.

During operation, coolant enters inlet pipe 102 and flows along inlet rail 104, which extends underneath (e.g., in the negative z-direction) cooling blocks 200 and cooling blocks 300. Portions of that coolant enter cooling blocks 200 and cooling blocks 300 by way of respective coolant inlet ports or "bosses," which fluidly couple respective inlet manifolds of cooling blocks 200 and cooling blocks 300 to inlet rail 104. Coolant then flows through cooling blocks 200 and cooling blocks 300, and collects in their respective outlet manifolds. The outlet manifolds of cooling blocks 200 and cooling blocks 300 are fluidly coupled to outlet rail 114 by way of respective coolant outlet ports or "bosses." Coolant in outlet rail 114 is then drawn through outlet pipe 112 (e.g., using a pump or other suitable means), and provided to a separate system that reduces the temperature of the coolant, before circulating it back through inlet pipe 102.

In some applications, cooling blocks 200 and cooling blocks 300 may have rigidly coupled thereto a set of vertically-extending (e.g., in the positive z-direction) heat sinks (not shown) extending from the top surfaces of cooling blocks 200 and cooling blocks 300. Such an arrangement allows for thin battery cells to be sandwiched between the heat sinks, which themselves are cooled by cooling blocks 200 and cooling blocks 300. However, cooling blocks 200 and cooling blocks 300 may be used to cool batteries in other orientations, or used to cool objects other than batteries in a variety of ways.

Figure 2:
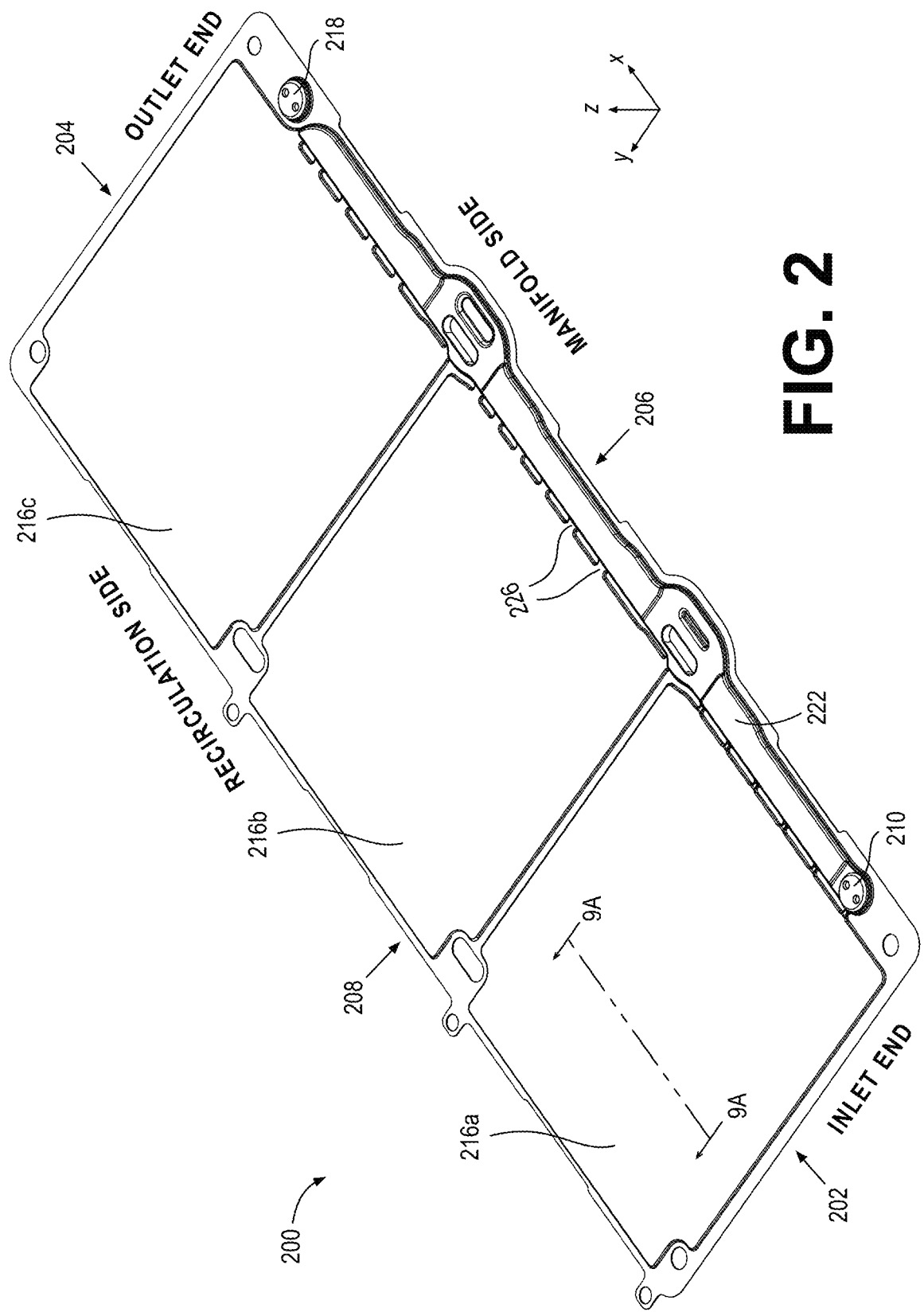
FIG. 2 is a perspective view of an example cooling block of the heat exchanger assembly, according to the embodiment of FIG. 1.

FIG. 2 is a perspective view of cooling block 200, according to the embodiment of FIG. 1. Cooling block 200 comprises three plates: top plate 220 (shown in FIG. 5), middle plate 250 (shown in FIGS. 6A and 6B), and bottom plate 280 (shown in FIGS. 4 and 7). The details of top plate 220 can be seen in the perspective drawing of FIG. 2.

As described above, cooling block 200 receives coolant at inlet boss 210, which extends downwardly (in the negative z-direction) into inlet rail 104. The coolant flow path is illustrated in greater detail in FIGS. 8 and 9. Inlet boss 210 is positioned within inlet distribution manifold 222, proximate to inlet end 202 of cooling block 200. Coolant flows through inlet boss 210 and is distributed through inlet manifold 222, which extends substantially across cooling block 200 between its inlet end 202 and its outlet end 204.

Figure 3:
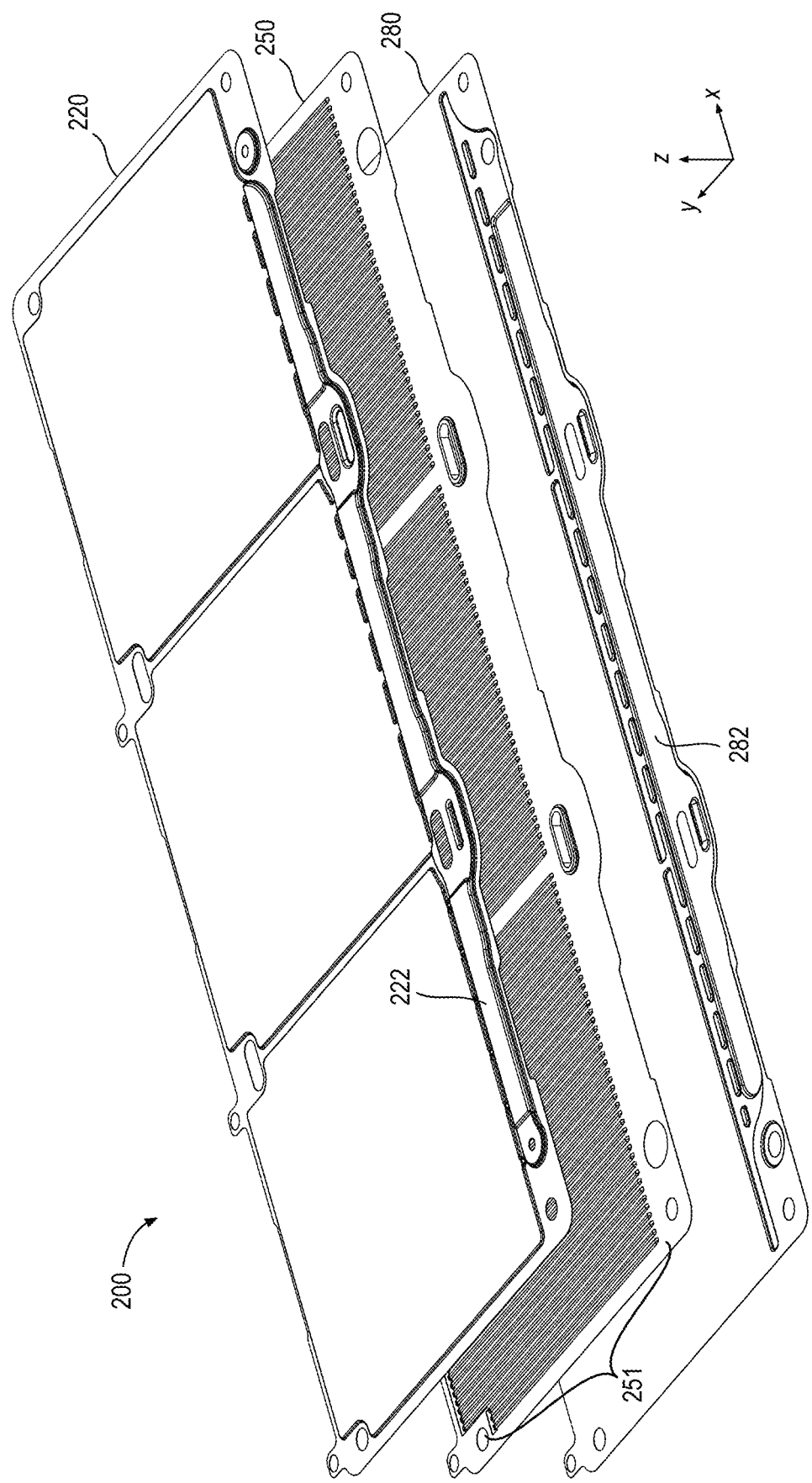
FIG. 3 is an exploded perspective view of the example cooling block, according to the embodiment of FIG. 2.

In this example, cooling block 200 includes three separate "matrixes" 216a, 216b, and 216c. Each matrix corresponds to a separate set of cooling channels, positioned proximate to a respective cooling surface (e.g., the substantially flat, embossed portion) and substantially extending between manifold side 206 and recirculation side 208. Some of these cooling channels, which are shown in greater detail in FIGS. 3 and 6, are fluidly coupled with inlet manifold 222 by way of inlet distribution apertures 226. Inlet manifold 222 distributes coolant across and through inlet distribution apertures 226.

As shown in FIGS. 2-7, the remaining coolant flow path is now briefly described. Coolant distributed through inlet manifold 222 and through inlet distribution apertures 226 enters a set of "feed" channels, such as feed channel 254, as shown in FIGS. 6A and 6B, and flows from manifold side 206 toward recirculation side 208, as shown in FIG. 2. The feed channels are fluidly coupled to a set of "return" channels, such as channel 252 (see FIGS. 6A and 6B), through one or more recirculation apertures, such as aperture 256 in middle plate 250 of FIGS. 6A and 6B, which are positioned proximate to recirculation side 208. Coolant flowing along the feed channels reverses direction and enters the return channels, flowing along the return channels from recirculation side 208 toward manifold side 206. Outlet collection manifold 282 is positioned "beneath" inlet manifold 222 (in the negative z-direction), which collects coolant from the feed channels. Coolant collected in the outlet manifold 282 flows out of cooling block 200 through outlet boss 218, which is fluidly coupled to outlet rail 114.

FIG. 3 illustrates an exploded view of top plate 220, middle plate 250, and bottom plate 280 of cooling block 200. As shown in FIG. 3, middle plate 250 includes a set of elongated corrugations or ridges 251 extending between manifold side 206 and recirculation side 208. In this specific example, the corrugations are embossed in the positive z-direction, forming a set of ridges with elongated gaps extending between adjacent ridges. The feed channels, such as feed channel 254 of FIG. 6B, as described above, are formed between these elongated gaps and the inner surface (the surface facing the negative z-direction) of top plate 220. Similarly, the return channels described above are formed between the space "underneath" the elongated ridges and the inner surface (the surface facing the positive z-direction) of bottom plate 280.

As shown in FIG. 3, outlet collection manifold 282 is positioned directly underneath (in a "stacked" orientation along the z-axis) inlet manifold 222. In this embodiment, the shape and dimensions of outlet collection manifold 282 differ from that of inlet manifold 222. The return channels— or the space underneath the elongated ridges of middle plate 250—extend over a portion of outlet manifold 282, to provide a fluid connection between them (see FIG. 12).

As also shown in FIG. 3, top plate 220, middle plate 250, and bottom plate 280 are preferably formed from a heat-conducting material, such as aluminum or other metals. Each plate may be constructed from a sheet of material that is deformed, cut, or otherwise shaped through hydroforming, stamping, or some other manufacturing technique. In addition, top plate 220, middle plate 250, and bottom plate 280 may be sealedly joined together using one or more joining techniques, such as welding, brazing, soldering, and/or crimping, among other possible techniques. Regardless of the particular manufacturing process or processes employed, the three plates are joined together in a sealed arrangement, such that coolant flow paths are fluid-tight and capable of withstanding pressurized fluid flowing therethrough without leaking coolant or deforming excessively.

Figure 4:
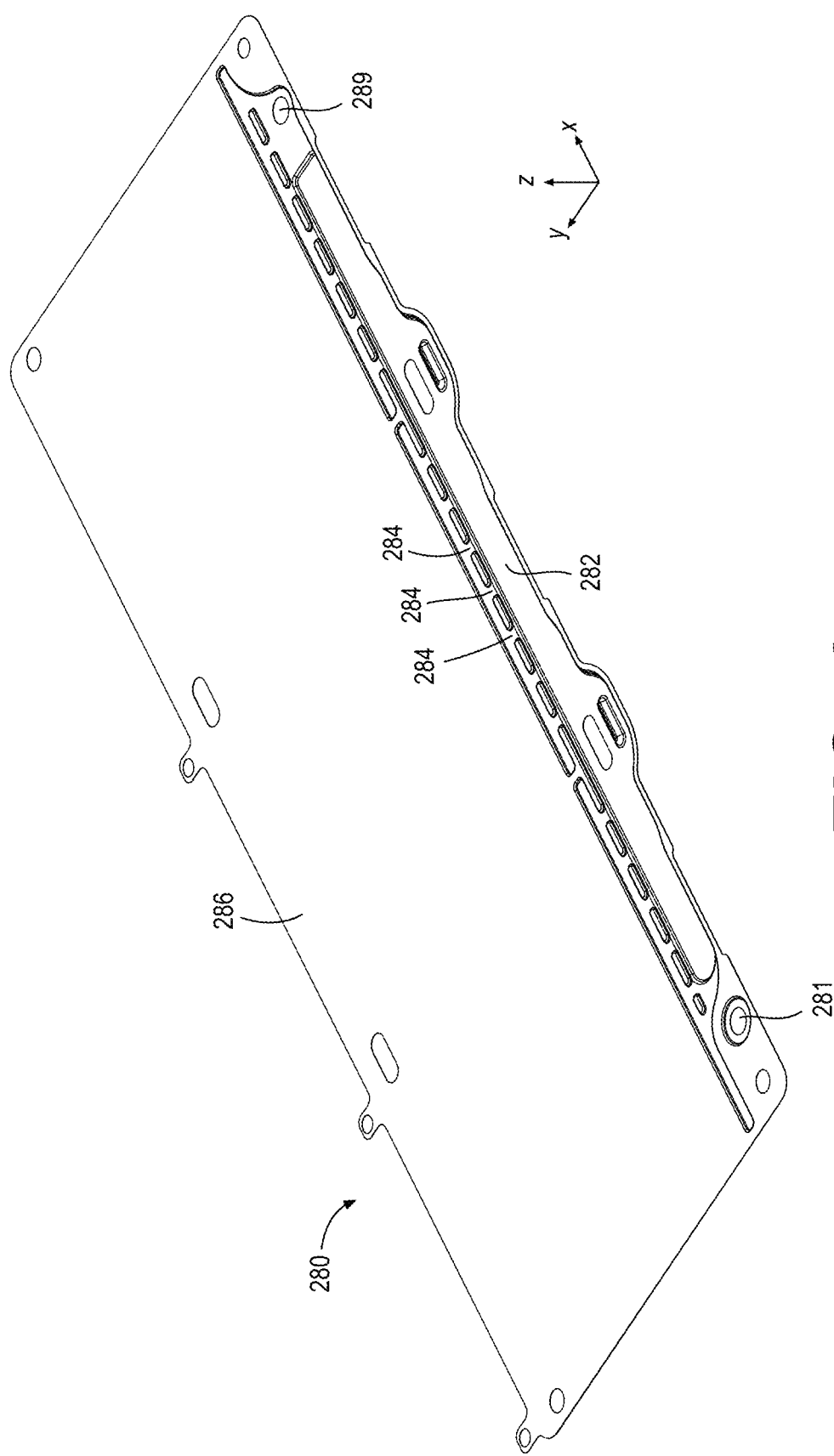
FIG. 4 is a perspective view of a bottom plate of the example cooling block, according to the embodiment of FIG. 2.
Figure 12:
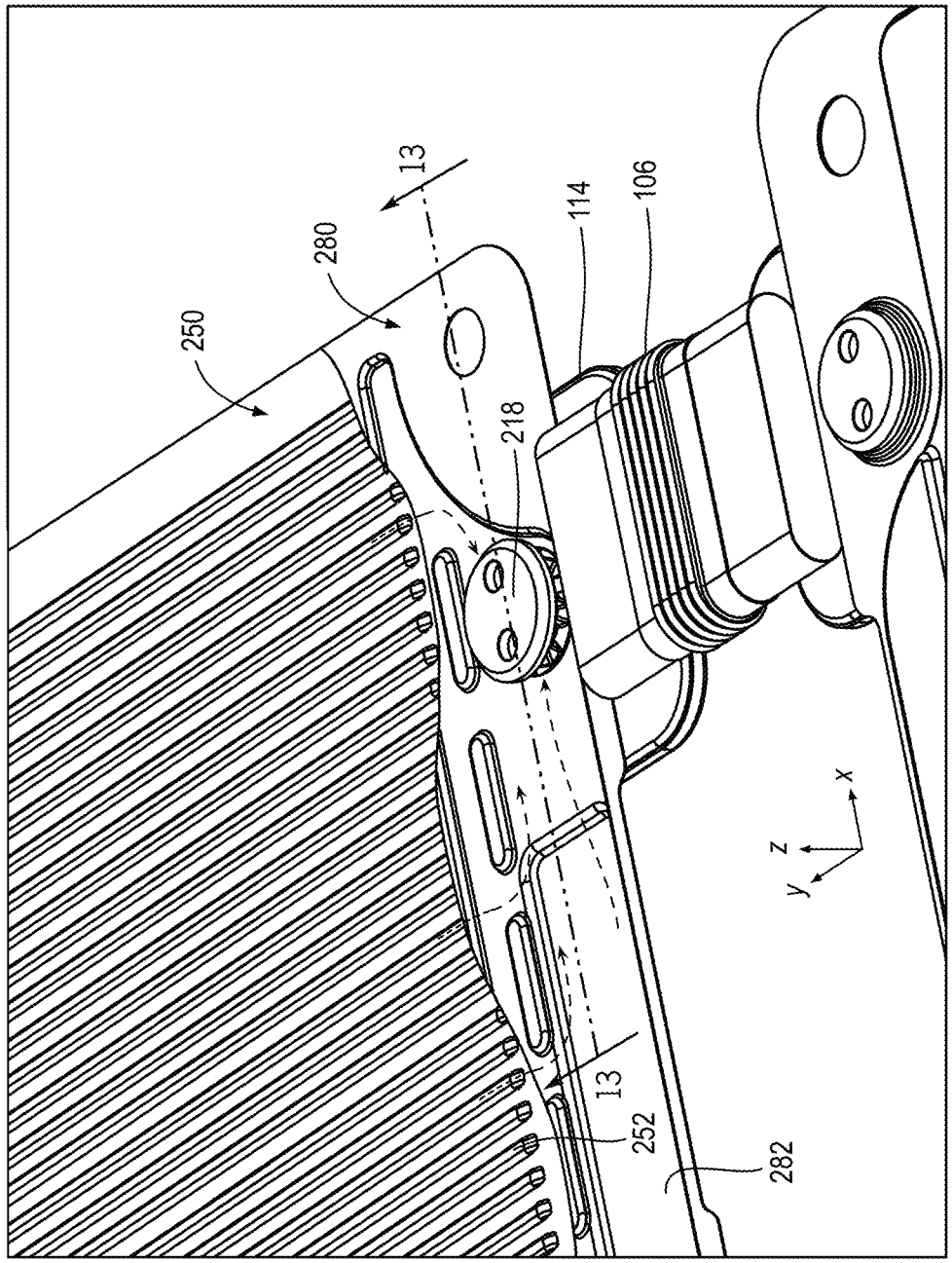
FIG. 12 is a detailed, perspective phantom view near a coolant outlet port of the example cooling block, according to the embodiment of FIG. 1.
Figure 13:
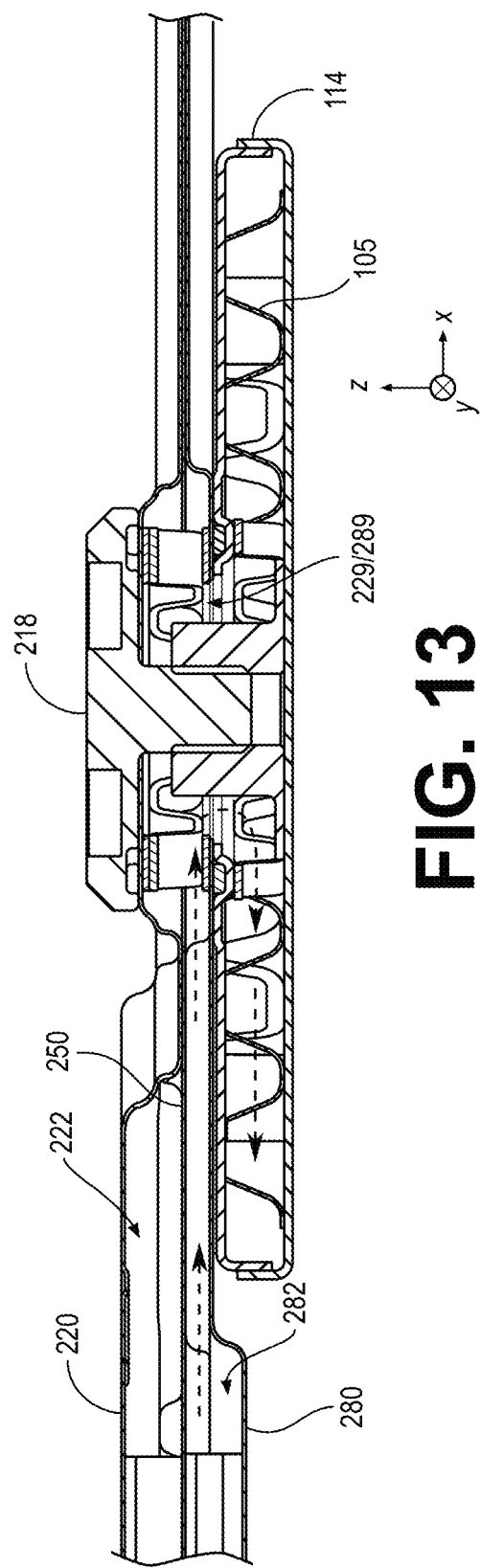
FIG. 13 is an elevated cross-sectional side view illustrating a fluid flow path near the coolant outlet port of the example cooling block, according to the embodiment of FIG. 12, taken along lines 13-13 and looking in the direction of the arrows.

FIG. 4 depicts bottom plate 280 in a perspective view. Bottom plate 280 includes inlet port 281, through which inlet boss 210 extends. Flat portion 286 of bottom plate 280 partially forms the walls defining the return channels. As shown in FIG. 4, outlet collection apertures 284 are spaced across and adjacent to outlet collection manifold 282, which fluidly couples the return channels with outlet collection manifold 282. Coolant collected in outlet collection manifold 282 is then directed toward outlet end 204, and through an outlet port defined by the space between outlet boss 218 and outlet port hole 289, as also shown in FIGS. 12 and 13.

Figure 5A:
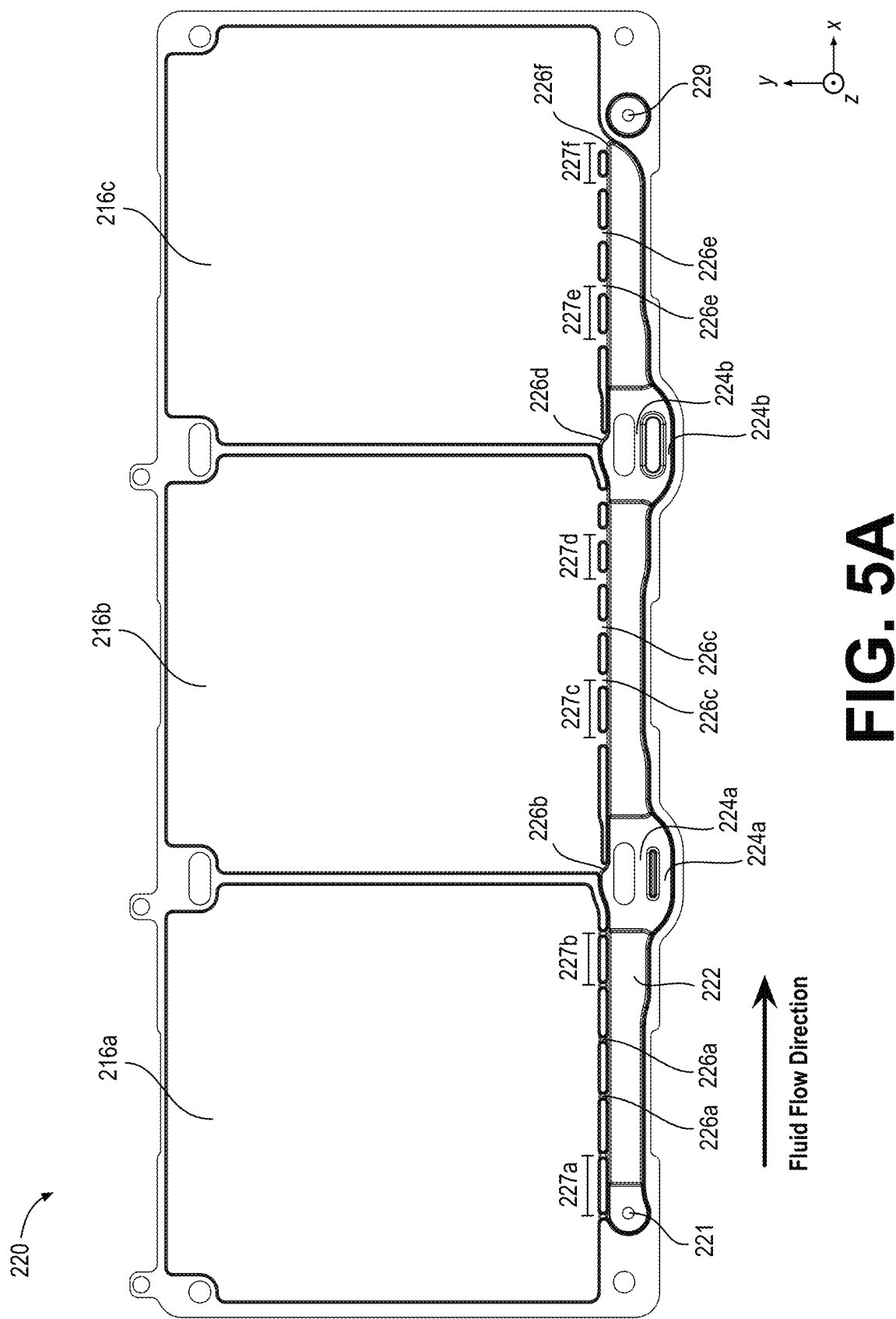
FIG. 5A is a top plan view of a top plate of the example cooling block, according to the embodiment of FIG. 2.
Figure 5B:
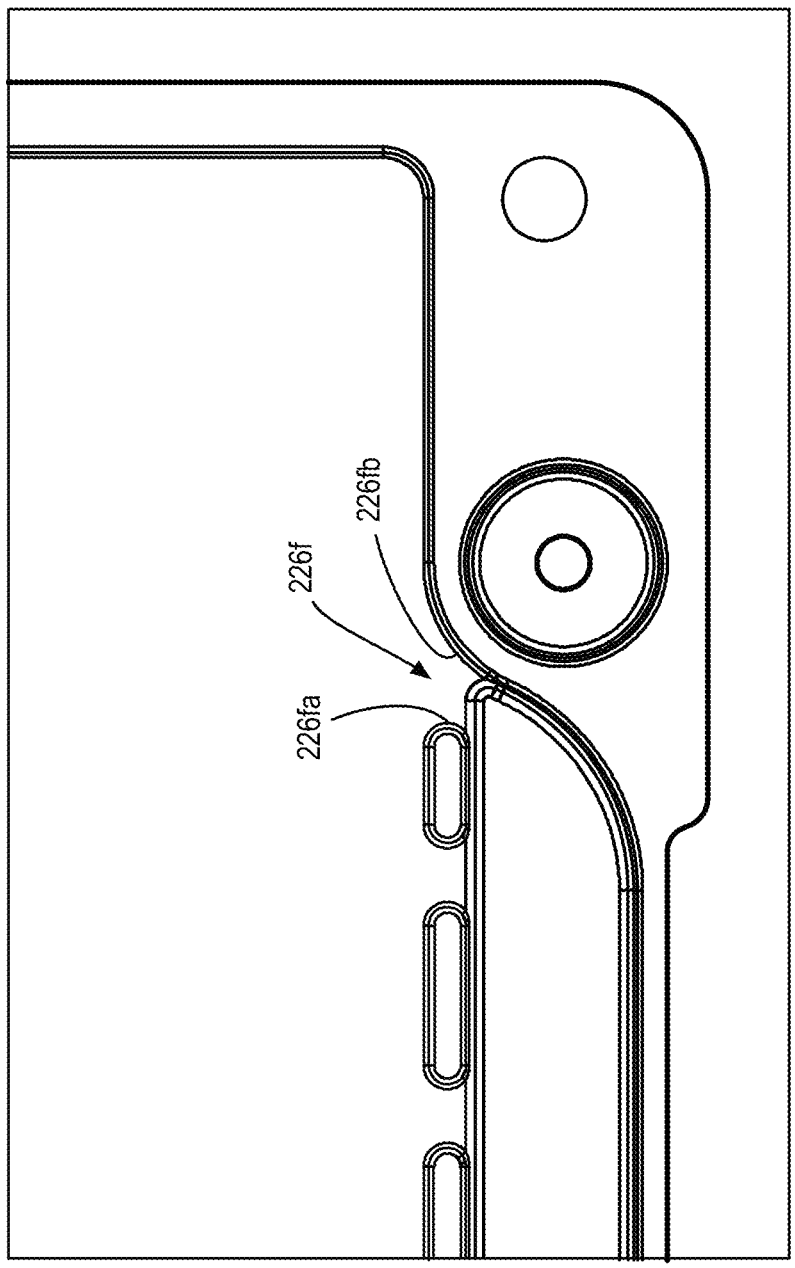
FIG. 5B is a detailed top plan view of a portion top plate of the example cooling block, according to the embodiment of FIG. 5A.

FIG. 5A is a top plan view of top plate 220, which has a number of flow-balancing features integrated therein. Top plate 220 includes inlet port hole 221, through which inlet boss 210 extends to provide a fluid connection between inlet rail 104 and inlet distribution manifold 222. Likewise, top plate 220 includes outlet port hole 229, through which outlet boss 218 extends. No fluid connection is provided between outlet boss 218 and any of the flow paths defined by top plate 220, so as to seal outlet boss 218.

As also shown in FIG. 5A, coolant entering through inlet port hole 221 is distributed across inlet manifold 222 and into respective coolant feed channels of matrixes 216a, 216b, and 216c, by way of inlet distribution apertures 226a-f. In this example, matrix 216a is positioned proximate to inlet end 202, matrix 216c is positioned proximate to outlet end 204, and matrix 216b is positioned between matrixes 216a and 216c.

More particularly, matrix 216a receives coolant directed through distribution apertures 226a; matrix 216b receives coolant directed through distribution apertures 226b and 226c; and matrix 216c receives coolant directed through distribution apertures 226d, 226e, and 226f. In some implementations, some or all of distribution apertures 226a-f may vary in size (e.g., have different cross sectional areas), to encourage more even fluid distribution across matrixes 216a-c.

For example, distribution apertures 226c may have a cross sectional area larger than that of distribution apertures 226a (e.g., 2 to 10 times larger, among other possible ratios). Larger distribution apertures may allow for an increased flow rate therethrough, which can compensate for lower fluid velocities and/or pressures. Thus, to the extent that fluid velocities near distribution apertures 226c are lower than fluid velocities near distribution apertures 226a, comparatively larger distribution apertures 226c can promote more even coolant flow between matrixes 216a and 216b.

In applications where fluid velocities and pressures are substantial, coolant entering inlet manifold 222 may tend to flow toward outlet end 204 (in the positive x-direction) and past distribution apertures 226, toward distribution aperture 226f. Without sufficient backpressure, such circumstances would lead to a greater amount of coolant entering distribution apertures proximate outlet end 204, compared to the amount of coolant entering distribution apertures near inlet end 202. Transition channels 224a and transition channels 224b restrict fluid flow across matrixes 216a, 216b, and 216c, and create backpressures that encourage more even fluid distribution across matrixes 216a-c.

Continuing with FIG. 5A, transition channels 224a fluidly connect portions of inlet manifold 222 corresponding to matrixes 216a and 216b. Likewise, transition channels 224b fluidly couple portions of inlet manifold 222 corresponding to matrixes 216b and 216c. By restricting fluid flow along inlet manifold 222, transition channels 224a and 224b lead to more even fluid pressures in the three portions of inlet manifold 222 adjacent to matrixes 216a, 216b, and 216c during operation. The sizes of transition channels 224a and 224b may be the same in some implementations, and different in others. In this example, transition channels 224a may collectively have a cross sectional area that is approximately 35% larger than the collective cross sectional area of transition channels 224b.

While transition channels 224a and 224b generally balance fluid pressure across the three sections of inlet manifold 222, they also disrupt nearby fluid flow. As a result, distribution apertures 226b and 226d, which are proximate to transition channels 224a and 224b, may be positioned near or within pockets of low or high pressure, which in turn could lead to an insufficient or excessive amount of coolant flowing through distribution apertures 226b and 226d. In the example shown in FIG. 5A, distribution apertures 226b and 226d are angled (that is, oriented approximately 30 degrees relative to distribution apertures 226a, 226c, and 226e), to account for the particular fluid dynamics produced by transition channels 224a and 224b, respectively.

Although specific distribution aperture angles are shown, the present application contemplates the modulation of distribution aperture orientations by various angles, including more or less severe angles than those of distribution apertures 226b and 226d, as well as distribution aperture angles pointing "away" from the inlet end (e.g., slanted in the direction opposite to distribution apertures 226b and 226d). Fluid flow rates through particular distribution apertures (e.g., those identified to have excessive or insufficient flow rates) may be adjusted by changing the angles to increase and/or decrease the flow rate through those particular distribution apertures.

In addition, as shown further in FIG. 5A, the shape of a particular distribution aperture may be modified to increase or decrease coolant flow rates through that particular distribution aperture. Distribution apertures not only have a "width" (in the x-direction), but also have a "depth" (in the y-direction), such that two "walls" extend in the y-direction by some amount. A given distribution aperture's angle may be adjusted by angling one or both of its walls. For example, referring to the inset of FIG. 5B, distribution aperture 226f includes one wall 226fa that is substantially parallel to the y-axis, and another wall 226fb that is tilted in the positive-x and positive-y direction. Thus, the cross sectional area of distribution aperture 226f at its boundary with inlet manifold 222 is approximately the same as the cross sectional area of distribution apertures 226e; however, the cross sectional area of distribution aperture 226f widens along the positive y-direction, due to its angled wall. A distribution aperture with only one angled wall, as in distribution aperture 226f, may also be used to increase or decrease fluid flow rates, depending on the particular implementation.

While different distribution aperture sizes and different transition channel sizes may be used to balance fluid flow rates across matrixes 216a, 216b, and 216c, fluid flow rates across coolant channels within each matrix may not necessarily be even. For instance, with respect to the portion of inlet manifold 222 associated with matrix 216b, fluid velocities and/or pressures near transition channels 224a may be different from fluid velocities and/or pressures near transition channels 224b. In some cases, as coolant flows into distribution apertures nearer inlet end 202, fluid pressures and velocities decrease around distribution apertures toward outlet end 202.

Where such unevenness occurs, the present invention can introduce balance into an intra-matrix fluid flow imbalance, by providing for different spacing between adjacent distribution apertures. As shown in FIG. 5A, distance 227a between two of distribution apertures 226a (nearer inlet end 202) is greater than distance 227b between a different pair of distribution apertures 226a (nearer outlet end 204). Thus, with respect to matrix 216a, the spacing between distribution apertures 226a decreases in the direction of fluid flow (in the positive x-direction).

Similarly, for matrix 216b, distance 227c between two of distribution apertures 226c (nearer inlet end 202) is larger than distance 227d between another pair of distribution apertures 226c (nearer outlet end 204). A similar diminishing distribution aperture distance is present in matrix 216c as well, where distance 227e is larger than distance 227f. However, the distances between distribution apertures may not always decrease in the positive x-direction. For example, distance 227c of matrix 216b may be greater than distance 227b of matrix 216a, despite being closer to outlet end 202. As shown in FIG. 5A, within a given matrix of the invention, the invention contemplates consistently decreasing distances in the direction of fluid flow.

The extent to which distances between adjacent distribution apertures decreases may vary, depending on the particular implementation. In the example shown and described with respect to FIG. 5A, the distance between each distribution aperture 226a may decrease by approximately 5-10% between each consecutive pair of distribution apertures 226a. However, it should be understood that the distribution aperture spacing may depend on the specific structural limitations of a given implementation.

Thus, as shown and described with respect to FIG. 5A, one or more flow-balancing features may be integrated within a heat exchanger in order to promote a more even and balanced fluid distribution, both inter-matrix and intra-matrix. By tuning the distribution aperture sizes, shapes, orientations, and spacing, many fluid flow imbalances can be mitigated. Moreover, the existence and/or dimensions of transition channels may be introduced into the inlet manifold to create effective backpressures, particularly in applications that experience substantially high levels of fluid velocities and pressures. Although a specific combination of these flow-balancing features are shown in the figures of the present applications, one or more of these features may be adjusted, tuned, and/or removed entirely, depending on the particular heat exchanger design and operation requirements.

Figure 6A:
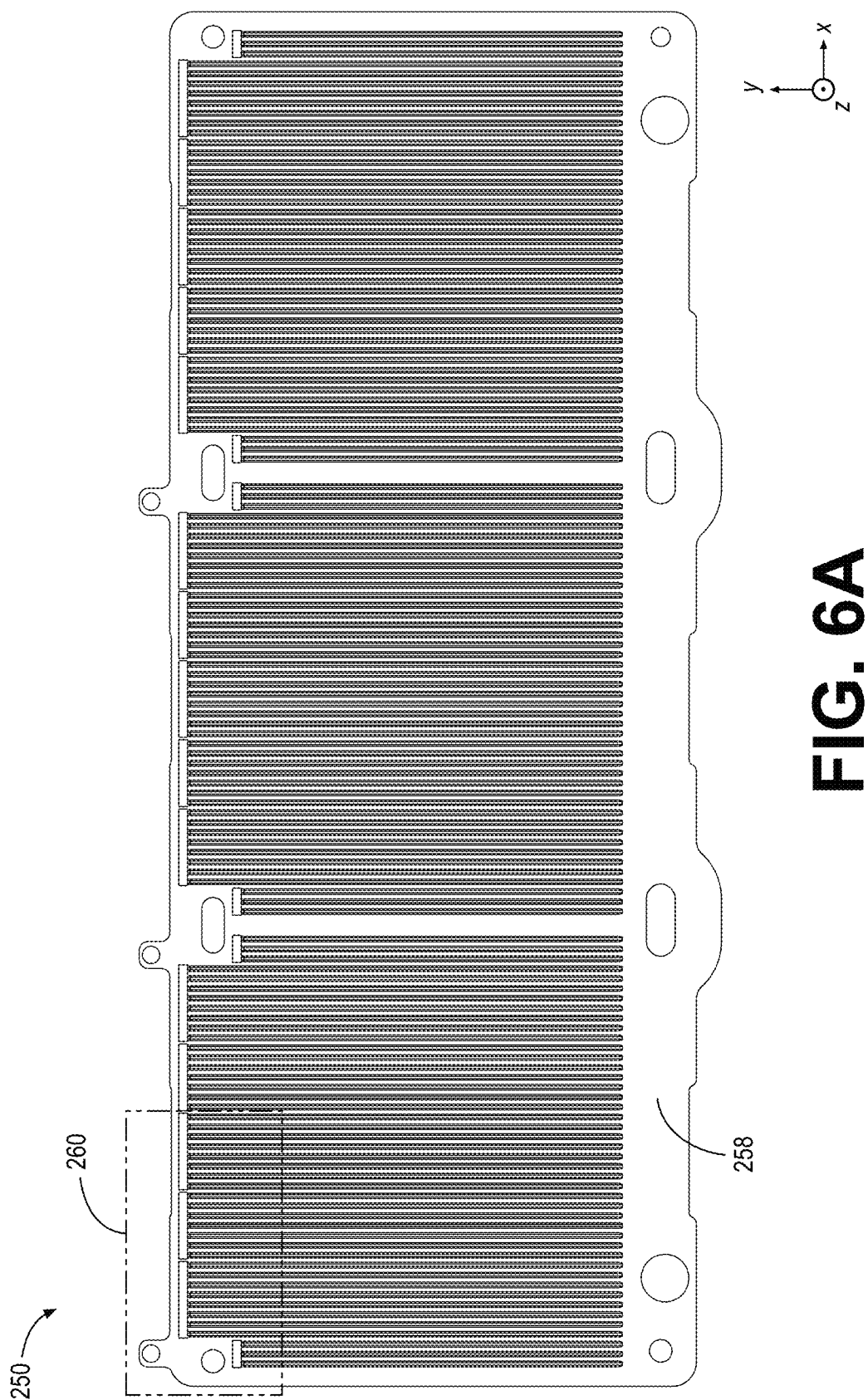
FIG. 6A is a top plan view of a middle plate of the example cooling block, according to the embodiment of FIG. 2.
Figure 6B:
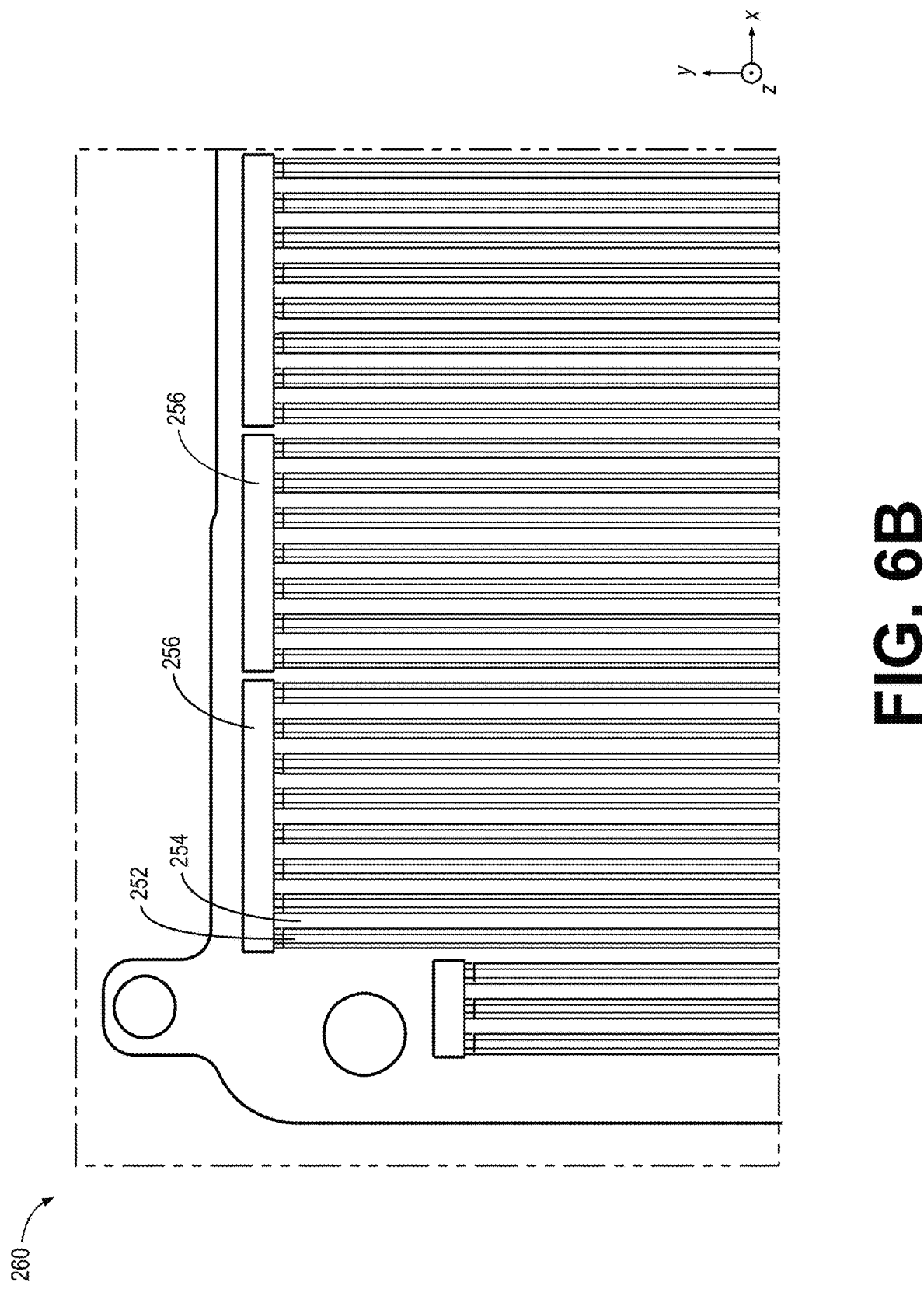
FIG. 6B is a detailed top plan view of a middle plate of the example cooling block, according to the embodiment of FIG. 6A.

FIG. 6A depicts a top plan view of middle plate 250. An inset of FIG. 6A showing portion of middle plate 250, as indicated by the dashed-line box shown in FIG. 6A, is provided in FIG. 6B. As shown in FIGS. 6A and 6B, a plurality of elongated ridges extend substantially between manifold side 206 and recirculation side 208 of middle plate 250. Each ridge is hollow, such that the walls of the ridges facing the negative z-direction partially define return channels 252. Likewise, spaces or "valleys" between each of the ridges partially define feed channels 254. In this example, return channels 252 and feed channels 254 are "interlaced" or alternating, to form a counter-flow arrangement.

As also shown in FIGS. 6A and 6B, flat portion 258 of middle plate 250 facing the positive z-direction partially defines the walls of inlet distribution manifold 222 shown in FIG. 5A. Coolant distributed along inlet distribution manifold 222 flows through distribution apertures 226 and into feed channels 254. Near recirculation side 208, feed channels 254 terminate at recirculation apertures 256, which are cut out portions of middle plate 250. When fully assembled, coolant flowing through feed channels 254 is directed through recirculation apertures 256, reverses direction and, in turn, flows into and along return channels 252. This recirculation portion of the coolant flow path is depicted in greater detail in FIG. 11.

Figure 7:
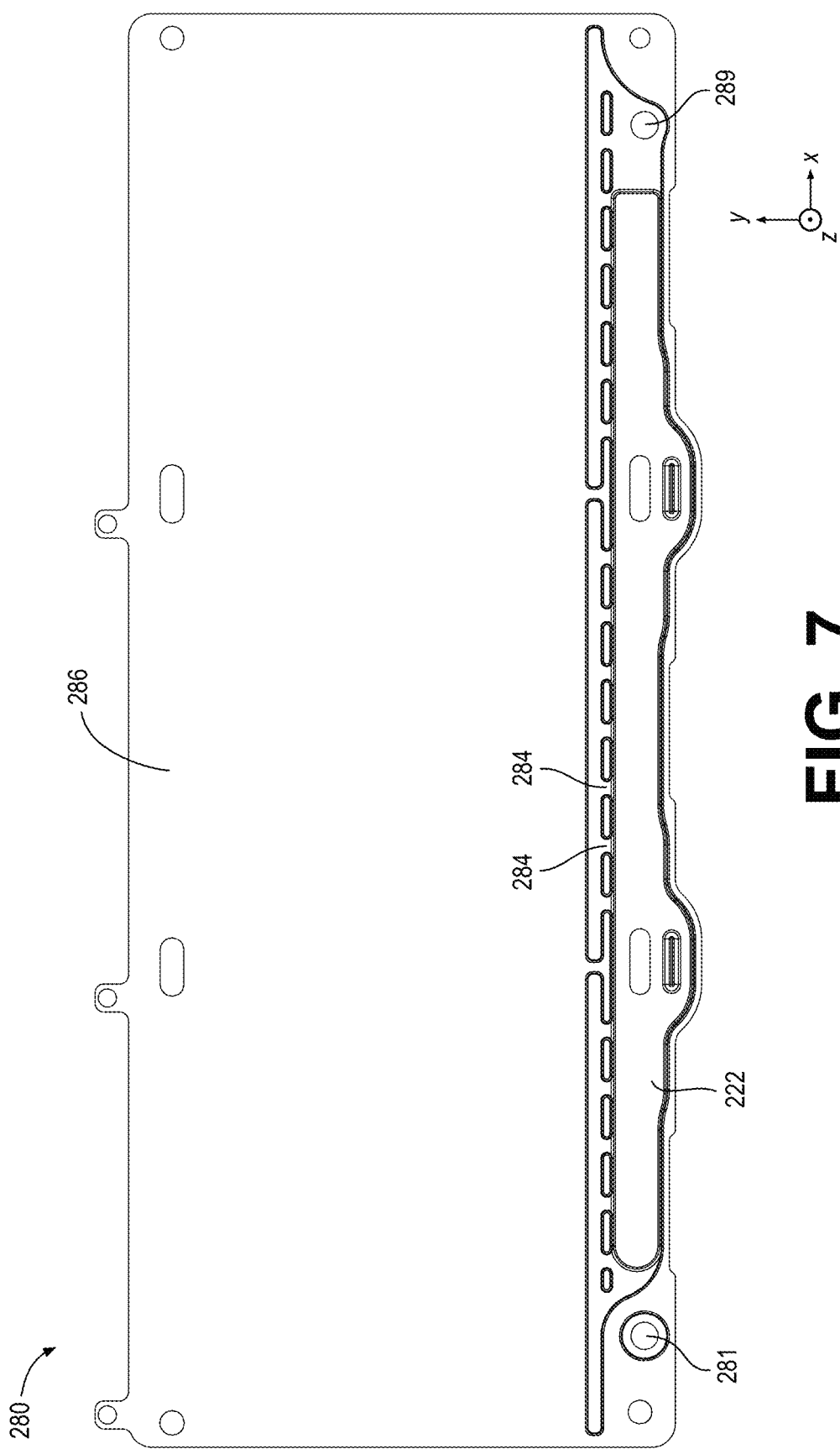
FIG. 7 is a top plan view of the bottom plate of the example cooling block, according to the embodiment of FIG. 2.

FIG. 7 shows a top plan view of bottom plate 280. Unlike inlet distribution apertures 226a-f, outlet collection apertures 284 do not vary substantially in size, shape, or orientation. In other words, the flow-balancing elements of cooling block 200 are primarily integrated with top plate 220 on the "inlet side" of the coolant flow path, rather than the "outlet side" of the coolant flow path.

FIG. 7 also depicts a few elongated depressions adjacent to outlet collection apertures 284 in the positive y-direction. The manifold-side tips of the ridges of middle plate 250 overlap (in the z-direction) with these elongated depressions, so as to fluidly connect return channels 252 with outlet collection apertures 284.

Figure 8:
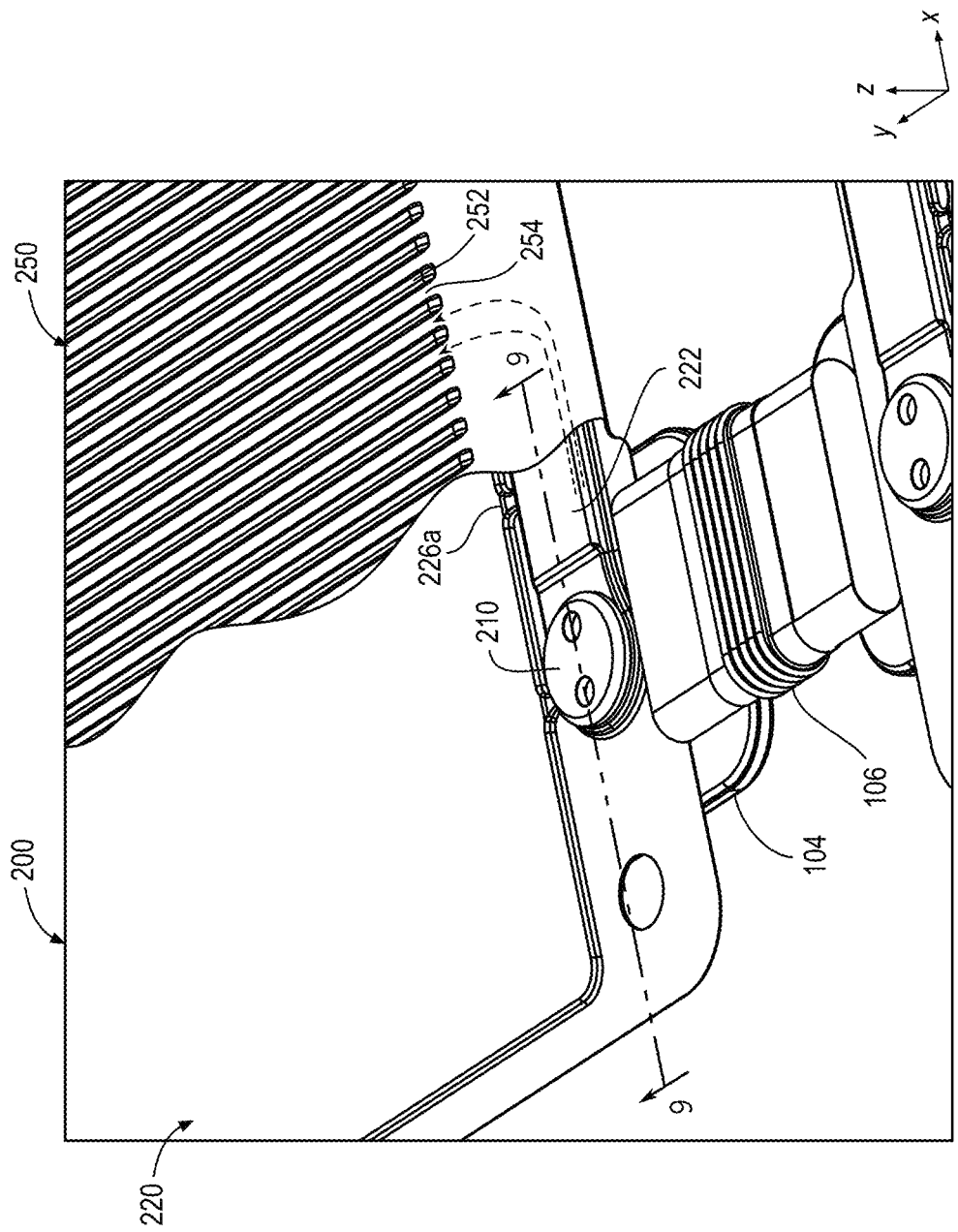
FIG. 8 is a detailed phantom perspective view of the example cooling block near a coolant inlet port, according to the embodiment of FIG. 1.

FIG. 8 illustrates a detailed phantom perspective view, near coolant inlet of cooling block 200. On the left side of the drawing, top plate 220 obscures the middle plate, whereas on the right side of the drawing, middle plate 250 is shown. A portion of coolant flowing through inlet rail 104 is directed upwardly through gap 223 surrounding inlet boss 210 (see FIG. 9) and into inlet manifold 222. As coolant passes through inlet manifold 222, portions of that coolant flow through inlet distribution apertures 226, and into feed channels 254.

FIG. 9 illustrates a cross-sectional view of the coolant flow path positioned near coolant inlet boss 210, for directing coolant into cooling block 200, taken along line 9-9 shown in FIG. 8. Dashed line arrows are provided in FIG. 9 to depict the flow path of coolant from inlet rail 104, up through gap 223 between inlet boss 210 and inlet port holes 221, 281, and into inlet manifold 222—as defined by the space between top plate 220 and middle plate 250 visible in the cross-sectional view of FIG. 9. Outlet collection manifold 282, while partially shown in FIG. 9, does not have a direct fluid connection with the coolant source at inlet rail 104.

As shown in FIG. 9, inlet rail 104 may also include additional structural elements therein, such as support 105. Structural elements such as support 105 may be situated within portions of inlet rail 104 to provide increased structural integrity, introduce turbulence or swirl, and/or otherwise balance an appropriate level of coolant flow up and through inlet boss 210, depending on the particular implementation.

Some coolant entering inlet manifold is directed through inlet aperture 226a, as shown in FIG. 9, into one or more feed channels 254. FIG. 9A depicts a cross-sectional view of feed channel 254 and return channel 252. As shown in FIG. 9A, middle plate 250 includes a set of ridges and "valleys," or spaces between the ridges. The spaces between the ridges, in conjunction with top plate 220, form feed channels such as feed channel 254. Likewise, the area underneath the ridges, in conjunction with bottom plate 280, forms return channels such as return channel 252.

Figure 10:
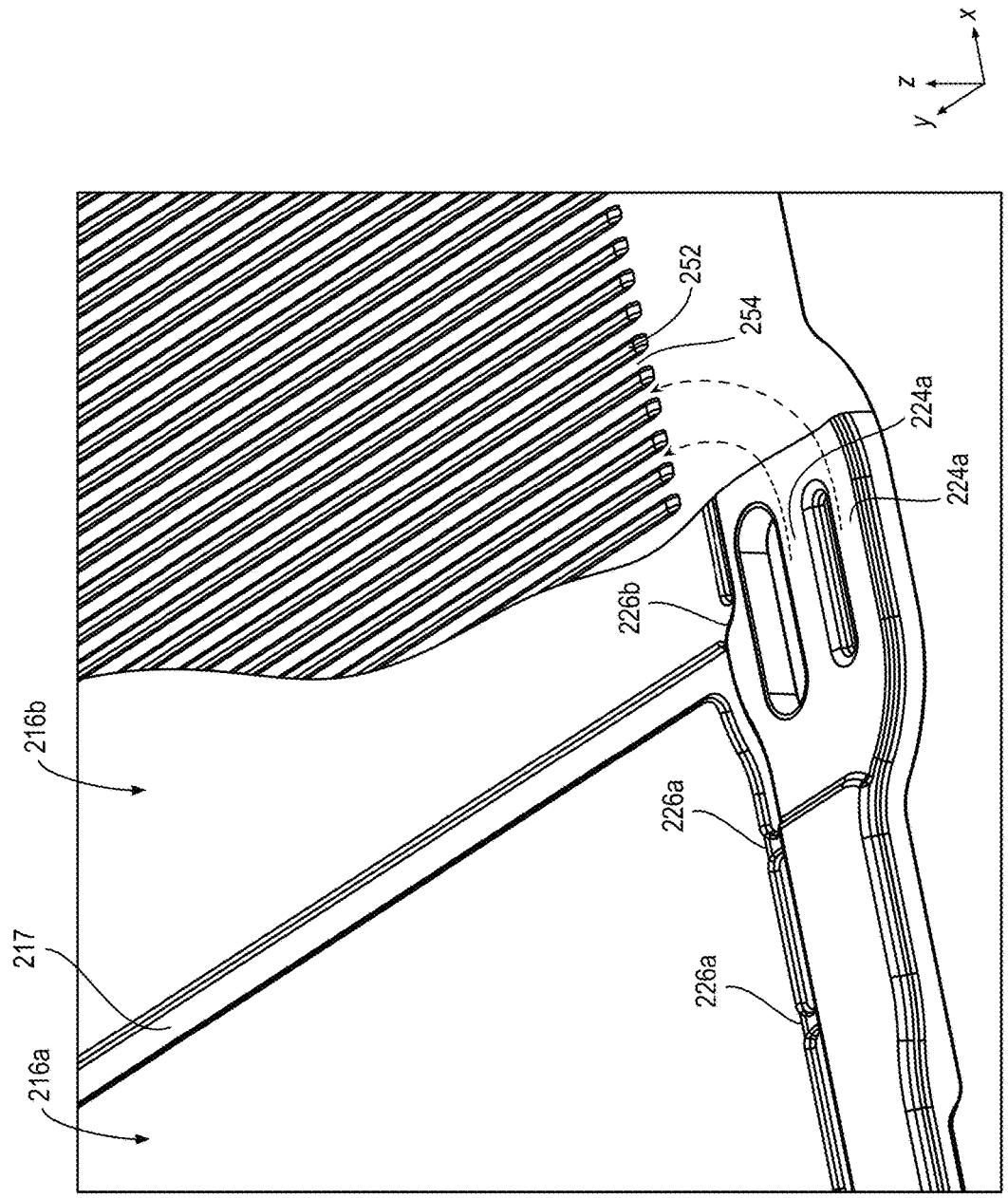
FIG. 10 is a detailed, perspective phantom view of a top and middle plate, near the transition channels between matrixes of the example cooling block, according to the embodiment of FIG. 2.

FIG. 10 illustrates a detailed phantom perspective view near transition channels 224a between matrixes 216a and 216b of cooling block 200. On the left side of the drawing, top plate 220 obscures the middle plate, whereas on the right side of the drawing, middle plate 250 is shown. As is shown in FIG. 10, matrixes 216a and 216b—while indirectly fluidly coupled by inlet manifold 222—are not directly fluidly coupled to each other. Rather, matrixes 216a and 216b terminate, and share a "flange" region 217 between them that is sealedly engaged with a plate portion of middle plate 250.

Figure 11:
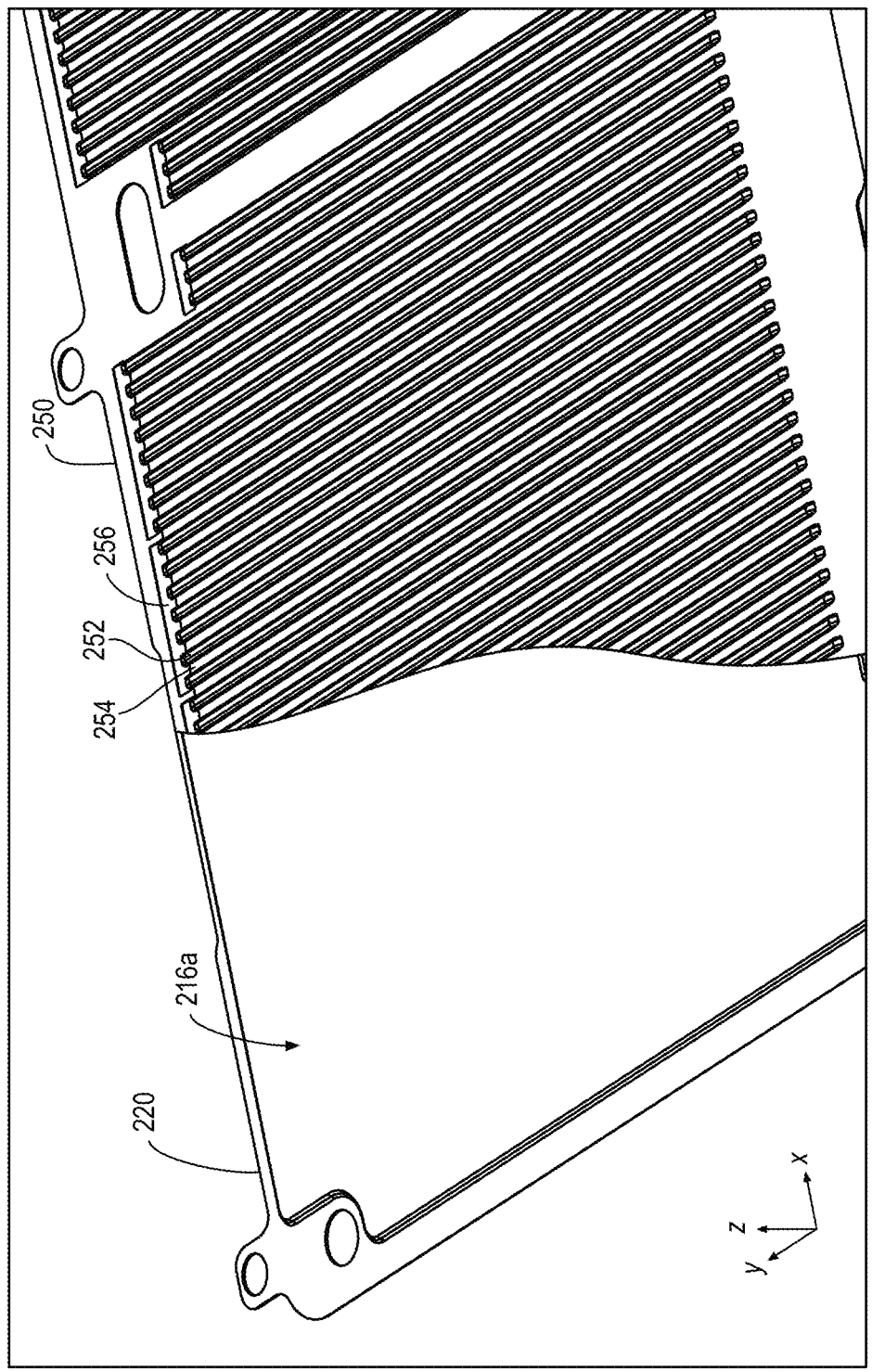
FIG. 11 is a detailed, perspective phantom view, proximate to the recirculation side of the cooling block, according to the embodiment of FIG. 2.

FIG. 11 illustrates a detailed phantom perspective view near recirculation side 208 of cooling block 200. On the left side of the drawing, top plate 220 obscures the middle plate, whereas on the right side of the drawing, middle plate 250 is shown. As is shown in FIG. 11, the tips of the elongated ridges of middle plate 250 extend over a portion of recirculation apertures 256, to allow coolant flowing along feed channels 254 to flow through recirculation apertures 256 and into hollow return channels 252 formed in the space beneath the ridges. A flanged region of top plate 220 extends along recirculation side 208, which is sealedly engaged to a flat portion of middle plate 250.

FIG. 12 depicts a detailed phantom perspective view near the coolant outlet port of cooling block 200. On the top side of the drawing, top plate 220 partially obscures the middle plate. As coolant travels along return channels 252 underneath the ridges of middle plate 250, it is collected along the depressed region proximate to outlet collection apertures 284. The coolant then flows through outlet collection apertures 284, into outlet collection manifold 282, and toward coolant outlet boss 218. Space 229/289 of FIG. 13, positioned between coolant outlet boss 218 and coolant outlet port holes 229, 289 allows coolant to exit outlet collection manifold 282, and flow into outlet rail 114.

FIG. 13 depicts a similar cross-sectional view of the coolant flow path near coolant outlet boss 218 from cooling block 200 and into outlet rail 114, taken along line 13-13 shown in FIG. 12. Dashed line arrows are provided in FIG. 13 to depict the flow path of coolant—from outlet manifold 282, down and through the space between outlet boss 218 and outlet port holes 229, 289, and into outlet rail 114. While partially shown in FIG. 9, inlet distribution manifold 222 does not have a direct fluid connection with coolant outlet at outlet rail 114.

Like inlet rail 104, outlet rail 114 may include additional structural elements therein, such as support 115. Structural elements such as support 115 may be situated within portions of inlet rail 114 to provide increased structural integrity, or for other flow balancing or strength reasons, depending on the particular implementation.

Figure 14:
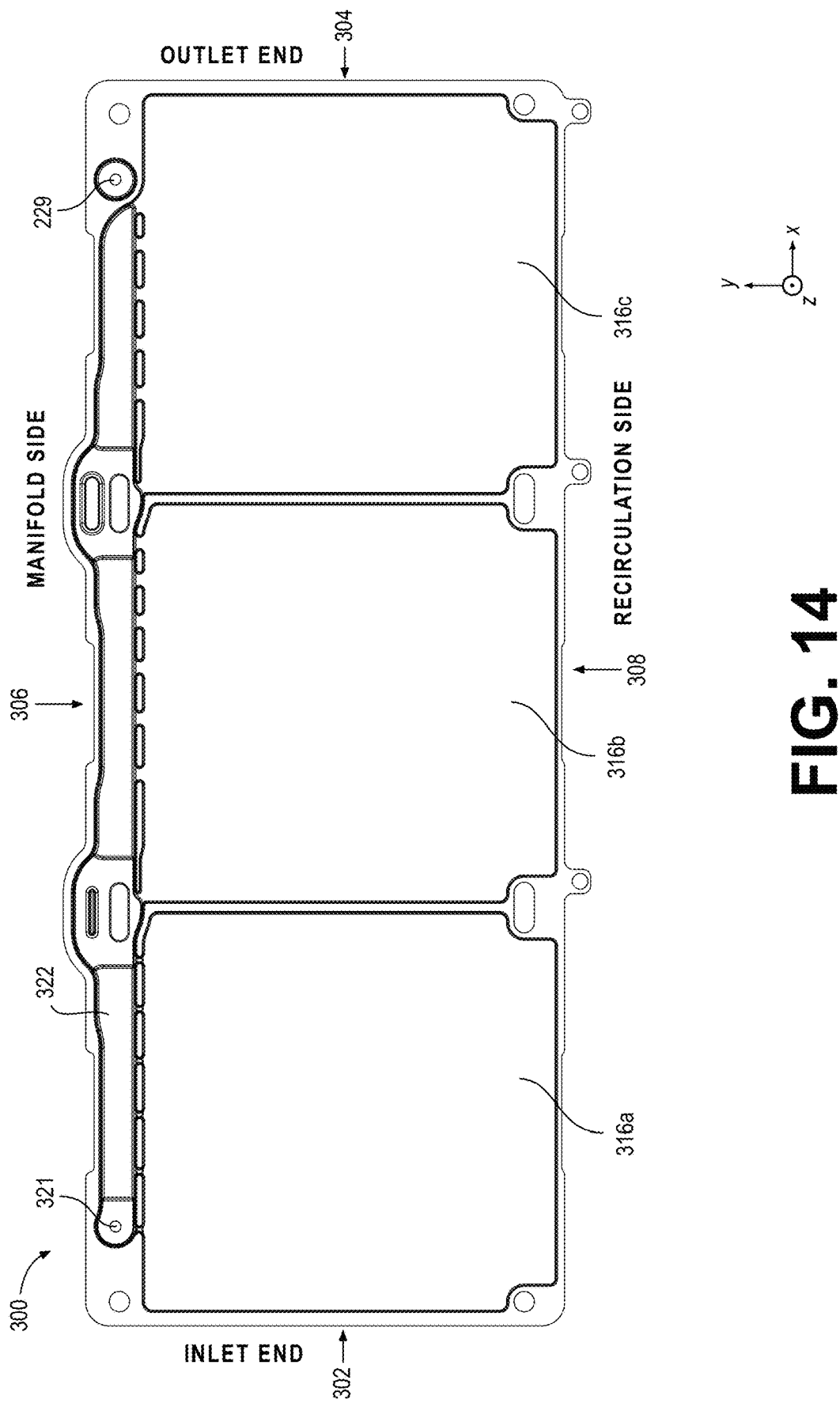
FIG. 14 is a top plan view of another example cooling block, according to the embodiment of FIG. 1.

FIG. 14 is a top plan view of cooling block 300. Similar to cooling block 200, cooling block 300 includes an inlet distribution manifold 322 adapted to receive coolant through coolant inlet port hole 321. Additionally, cooling block 300 includes three matrixes: matrix 316a, matrix 316b, and matrix 316c. As with cooling block 200, cooling block 300 may similarly integrate flow-balancing elements therein to promote a more even coolant distribution across cooling block 300. However, in cooling block 300, manifold side 306 and recirculation side 308 are switched, compared to that of cooling block 200. While having two types of cooling blocks (cooling block 200 and cooling block 300) enable heat exchanger assembly 100 to be compact, the orientation of cooling block 300 is not necessarily identical to the orientation of cooling block 200—though the processes for forming each may be identical, albeit using different molds, press brake dies, or other tooling.

FIG. 15 illustrates an example arrangement of battery pack 130, which is in contact with, and extending from, the matrix 216a section of cooling block 200 within heat exchanger assembly 100. In one example arrangement, thin battery cells (e.g., rectangular lithium ion cells) may be positioned between metal fins, thereby forming battery pack 130. As the battery cells of battery pack 130 are charged and discharged, temperature fluctuations in battery pack 130 are regulated by cooling block 200 of heat exchanger assembly 100. A thermal management system that incorporates heat exchanger assembly 100 may include other structural elements that enclose heat exchanger assembly 100, battery pack 130, metal fins, and/or other components.

Figure 16:
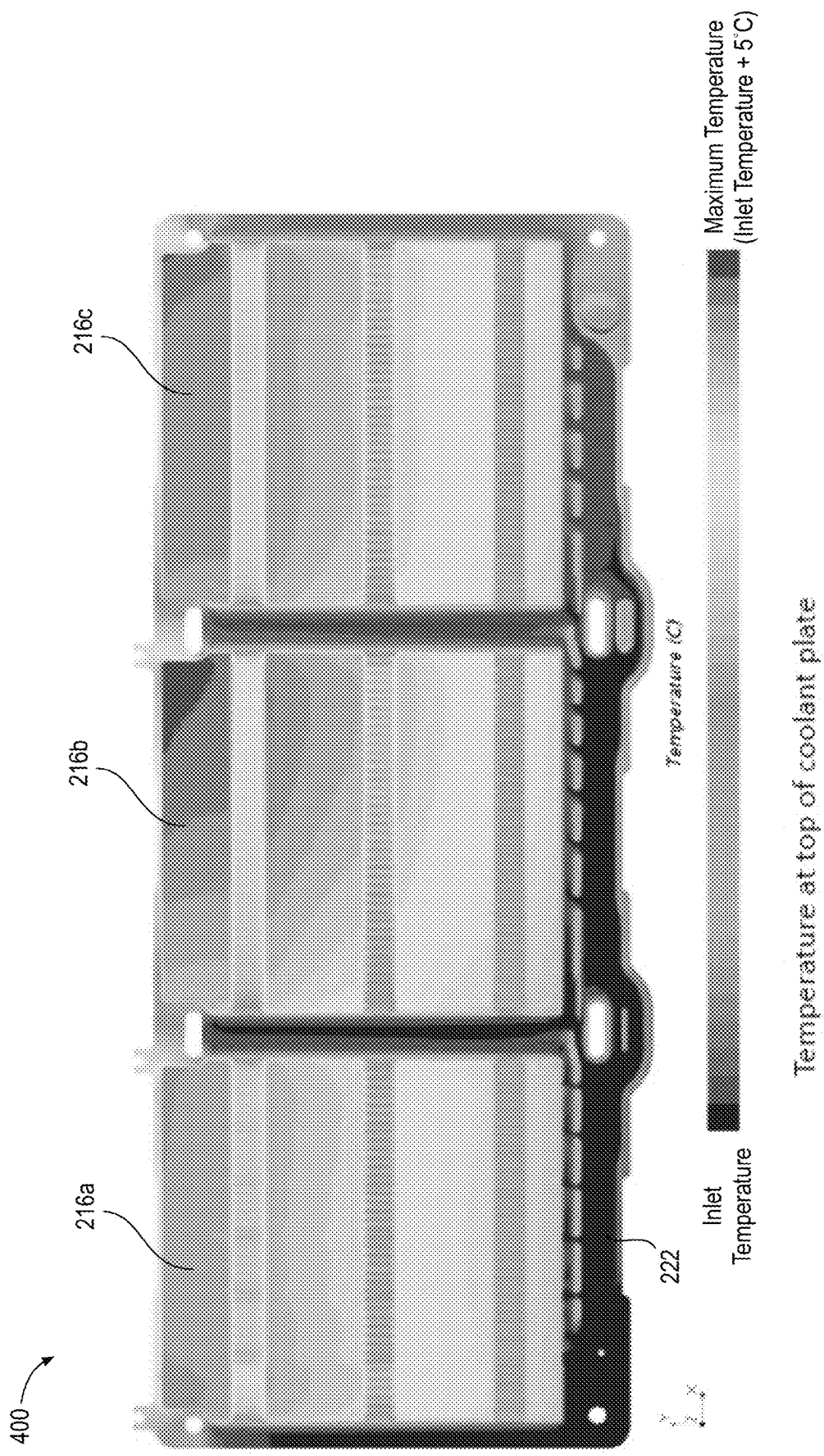
FIG. 16 illustrates a thermal gradient display representing temperatures measured along the top plate of the cooling block, during a simulation.

FIG. 16 is a thermal gradient display, representing temperatures measured along top plate's 220 cooling surfaces during a performance simulation. Cooling block 200 shown and described herein was modeled in a computer aided design (CAD) program. A simulation was then performed, using parameters expected during operation of heat exchanger assembly 100 in a real world environment (e.g., between one and ten liters per minute, among other possible flow rates). The program also simulated heat-generating objects, which transferred heat into the simulated coolant.

The simulation demonstrated that the example heat exchanger assembly 100 is capable of maintaining battery temperatures at or near their optimum operating conditions. In addition, the simulated heat exchanger assembly 100 revealed that the largest thermal gradient across the cooling block was approximately 4 to 5 degrees Celsius (between the upper right corner of matrix 216b and the bottom left corner of matrix 216a)—a substantial improvement, at least in terms of temperature uniformity, over prior low-profile plate-type heat exchangers. The present application contemplates tuning the flow-balancing features described herein to achieve even greater temperature uniformity. The heat exchangers integrating flow-balancing features described herein, therefore, are suitable in a variety of applications, including the thermal management of high-performance battery systems.

Although certain example methods and apparatus have been described herein, the scope of coverage of this patent is not limited thereto. On the contrary, this patent covers all methods, apparatuses, and articles of manufacture fairly falling within the scope of the appended claims, either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or as other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A heat exchanger for regulating the temperature of objects using a coolant, said heat exchanger comprising:
   a top plate, a bottom plate, and a middle plate operably situated between said top and bottom plates, said top, middle, and bottom plates being sealedly engaged for circulation of said coolant, and collectively forming a stacked cooling block having an inlet end and an outlet end substantially opposite the inlet end, and a manifold side and a recirculation side substantially opposite the manifold side, each of said manifold and recirculation sides being operably positioned between each of said inlet and outlet ends, respectively;
   a plurality of coolant flow channels extending substantially between said manifold and recirculation sides, said plurality of coolant flow channels comprising a set of coolant feed channels formed between the top and middle plates and a set of coolant return channels formed between the bottom and middle plates, wherein the set of coolant feed channels and the set of coolant return channels are fluidly connected through one or more recirculation apertures that are formed within said middle plate proximate to said recirculation side, or are defined by space between said top and bottom plates extending beyond an edge of said middle plate;
   an inlet distribution manifold formed between the top and middle plates proximate to said manifold side and extending substantially between said inlet end and said outlet end, said inlet distribution manifold being adapted to receive coolant from a coolant inlet port positioned proximate to said inlet end, and positioned to direct coolant through a plurality of inlet distribution apertures fluidly connected to said set of coolant feed channels; and an outlet collection manifold formed between the bottom and middle plates proximate to said manifold side and extending substantially between said inlet end and said outlet end, said inlet distribution manifold being adapted to receive coolant from said set of coolant return channels through a plurality of outlet collection apertures fluidly connected thereto, and positioned to direct coolant toward a coolant outlet port positioned proximate to said outlet end, wherein said outlet collection manifold is in substantial stacked alignment with said inlet distribution manifold.

2. The heat exchanger according to claim 1, in which said plurality of inlet distribution apertures includes (i) one or more first inlet distribution apertures having a first cross sectional area, and (ii) one or more second inlet distribution apertures having a second cross sectional area that is larger than the first cross sectional area, wherein the one or more first inlet distribution apertures are positioned nearer to said coolant inlet port than the positions of said one or more second inlet distribution apertures, to promote substantially even coolant distribution through at least the one or more first inlet distribution apertures positioned closer to said coolant inlet port, and the one or more second inlet distribution apertures positioned further from said coolant inlet port.

3. The heat exchanger according to claim 1, in which said plurality of inlet distribution apertures includes at least (i) a first pair of inlet distribution apertures having a first distance extending therebetween, and (ii) a second pair of inlet distribution apertures having a second distance extending therebetween that is smaller than the first distance, wherein the first pair of inlet distribution apertures is positioned nearer to said coolant inlet port than the second pair of inlet distribution apertures to promote substantially even coolant distribution through at least the first and second pairs of inlet distribution apertures.

4. The heat exchanger according to claim 1, in which said cooling block comprises:
a first matrix comprising a first series of the plurality of coolant flow channels, a first section of said inlet distribution manifold, and a first series of said inlet distribution channels; and
a second matrix comprising a second series of the plurality of coolant flow channels, a second section of said inlet distribution manifold, and a second series of said inlet distribution channels,
wherein the first matrix is positioned nearer to said coolant inlet port than the second matrix, and wherein the first and second sections of the inlet distribution manifold are fluidly connected, to distribute coolant into both of said first and second series of the plurality of coolant flow channels.

5. The heat exchanger according to claim 4, in which said first series of inlet distribution apertures of said first matrix includes at least (i) a first pair of inlet distribution apertures having a first distance extending therebetween, and (ii) a second pair of inlet distribution apertures having a second distance extending therebetween that is smaller than the first distance, wherein the first pair of inlet distribution apertures is positioned nearer to said coolant inlet port than the second pair of inlet distribution apertures to promote substantially even coolant distribution through at least the first and second pairs of inlet distribution apertures.

6. The heat exchanger according to claim 4, in which said first series of inlet distribution apertures of said first matrix each have a first cross sectional area, and said second series of inlet distribution apertures of said second matrix each have a second cross sectional area that is larger than the first cross sectional area, to promote substantially even coolant distribution between the first and second portions of said inlet distribution manifold.

7. The heat exchanger according to claim 4, in which said inlet distribution manifold further comprises one or more transition channels extending substantially between said first section of the inlet distribution manifold and said second section of the inlet distribution manifold, wherein said one or more transition channels restrict coolant fluid flow between the first and second sections of the inlet distribution manifold, such that coolant entering the inlet distribution manifold through said coolant inlet port is substantially evenly distributed between the first and second sections of the inlet distribution manifold.

8. The heat exchanger according to claim 7, in which said second series of inlet distribution apertures of said second matrix includes at least one distribution aperture that is proximate to said one or more transition channels and is angled relative to the other inlet distribution channels of the second series of inlet distribution channels, to promote substantially even coolant distribution across each aperture of said second series of inlet distribution apertures.

9. The heat exchanger according to claim 4, in which said cooling block further comprises:
a third matrix comprising a third series of the plurality of coolant flow channels, a third section of said inlet distribution manifold, and a third series of said inlet distribution channels;
wherein the third matrix is positioned further from said coolant inlet port than the second matrix, and wherein the second and third sections of the inlet distribution manifold are fluidly connected, such that said inlet distribution manifold distributes coolant into the first, second, and third series of the plurality of coolant flow channels.

10. The heat exchanger according to claim 4, wherein said one or more transition channels are one or more first transition channels, and in which said inlet distribution manifold further comprises:
one or more second transition channels extending substantially between said second section of the inlet distribution manifold and said third section of the inlet distribution manifold, wherein said one or more second transition channels restrict coolant fluid flow between the second and third sections of the inlet distribution manifold, such that coolant entering the inlet distribution manifold through said coolant inlet port is substantially evenly distributed among the first, second, and third sections of the inlet distribution manifold.

11. The heat exchanger according to claim 1, further comprising a coolant inlet rail in fluid connection with said coolant inlet port and adapted to direct coolant through said coolant inlet port and into said inlet distribution manifold.

12. The heat exchanger according to claim 1, further comprising a coolant outlet rail in fluid connection with said coolant outlet port and adapted to receive coolant through said coolant outlet port from said outlet collection manifold.

13. The heat exchanger according to claim 1, further comprising a plurality of cooling fins in contact with and extending from said top plate, said plurality of cooling fins adapted to draw heat away from objects in contact therewith to, in turn, exchange heat with coolant flowing through said plurality of coolant flow channels.

14. The heat exchanger according to claim 1, further comprising one or more inlet manifold supports situated within said inlet distribution manifold.

15. The heat exchanger according to claim 1, further comprising one or more outlet manifold supports situated within said outlet collection manifold.

* * * * *